United States Patent [19]
Kusakata et al.

[11] Patent Number: 5,057,154

[45] Date of Patent: Oct. 15, 1991

[54] LEUCO DYES AND RECORDING MATERIAL EMPLOYING THE SAME

[75] Inventors: Shigeru Kusakata, Susono; Hiroshi Gotoh, Fuji; Isao Shiojima, Mishima, all of Japan

[73] Assignee: Ricoh Company, Ltd., Tokyo, Japan

[21] Appl. No.: 512,208

[22] Filed: Apr. 20, 1990

Related U.S. Application Data

[62] Division of Ser. No. 291,675, Dec. 29, 1988, Pat. No. 4,939,117.

[30] Foreign Application Priority Data

| | | | |
|---|---|---|---|
| Jan. 8, 1988 | [JP] | Japan | 63-2155 |
| Jan. 18, 1988 | [JP] | Japan | 63-8179 |
| Mar. 17, 1988 | [JP] | Japan | 63-64892 |
| Mar. 17, 1988 | [JP] | Japan | 63-64893 |

[51] Int. Cl.$^5$ ...................... C09D 11/00; C09B 23/00; B41M 5/136

[52] U.S. Cl. .......................................... 106/21; 8/638; 8/644; 8/657; 503/218; 503/224

[58] Field of Search ...................... 106/21; 8/636, 638, 8/644, 657; 503/218, 224

[56] References Cited

U.S. PATENT DOCUMENTS

| | | | |
|---|---|---|---|
| 3,957,288 | 5/1976 | Lemahieu et al. | 503/218 |
| 3,958,815 | 5/1976 | Poot et al. | 503/218 |

FOREIGN PATENT DOCUMENTS

| | | | |
|---|---|---|---|
| 0230890 | 11/1985 | Japan | 503/224 |

*Primary Examiner*—William R. Dixon, Jr.
*Assistant Examiner*—Helene Klemanski
*Attorney, Agent, or Firm*—Oblon, Spivak, McClelland, Maier & Neustadt

[57] ABSTRACT

A leuco dye of the formula (I):

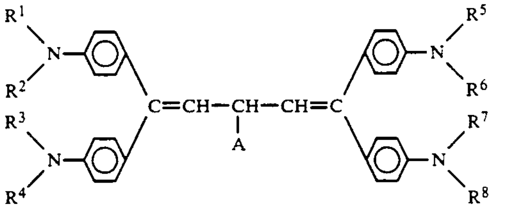

(I)

wherein $R^1$, $R^2$, $R^3$, $R^4$, $R^5$, $R^6$, $R^7$, and $R^8$ each represent a lower alkyl group; A represents

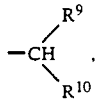

in which $R^9$ and $R^{10}$ each represent hydrogen, provided that both $R^9$ and $R^{10}$ may not be hydrogen, —CN or —$COR^{14}$ in which $R^{14}$ represents a phenyl group which is unsubstituted or is substituted by an alkyl group having 1 to 4 carbon atoms, an alkoxyl group having 1 to 4 carbon atoms, or a halogen, a naphthyl group which is unsubstituted or is substituted by an alkyl group having 1 to 4 carbon atoms, an alkoxyl group having 1 to 4 carbon atoms or a halogen, or a lower alkoxyl group,

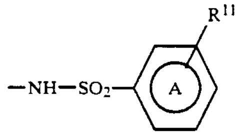

in which

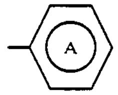

represents a phenyl group or a naphthyl group, $R^{11}$ represents hydrogen, a lower alkyl group, a halogen, an amino group, which is unsubstituted or is substituted by an alkyl group having 1 to 4 carbon atoms, or a nitro group, or

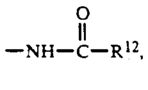

in which $R^{12}$ represents a lower alkyl group, or

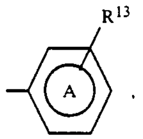

in which $R^{13}$ represents hydrogen, a lower alkyl group, a halogen, a hydroxyl group, a trifluoromethyl group, a nitro group, an amino group which is unsubstituted or is substituted by an alkyl group having 1 to 4 carbon atoms, or amide group. These dyes absorb in the near-infrared region and yields colored images with a color developer therefor with excellent preservability.

18 Claims, No Drawings

LEUCO DYES AND RECORDING MATERIAL EMPLOYING THE SAME

This is a division of application Ser. No. 07/291,675 filed on Dec. 29, 1988, now U.S. Pat. No. 4,939,117.

BACKGROUND OF THE INVENTION

The present invention relates to leuco dyes and a recording material employing the same, which is capable of yielding colored images having a sufficient absorption intensity in a near infrared region, especially used as a thermosensitive recording sheet and a pressure-sensitive recording sheet.

Recording materials using leuco dyes, as shown in Japanese Patent Publication No. 45-14039, are conventionally known and used in practice, for example, as pressure-sensitive recording sheets and thermosensitive recording sheets. Recently the above-mentioned pressure-sensitive recording sheets and thermosensitive recording sheets have been increasingly used.

There are generally used triphenylmethane-type leuco dyes, fluoran-type leuco dyes, phenothiazine-type leuco dyes and auramine-type leuco dyes. These leuco dyes are colored in a variety of different colors and are selectively used depending on the application.

However, such dyes have been developed, with an emphasis on the improvement of the color tone, that is, on the improvement of the absorption in the visible spectrum. Until recently, no dyes which can absorb the near infrared rays having a wavelength of 700 to 1,000 nm have been developed.

As a semiconductor laser becomes prevalent, a tendency to read recorded images such as bar codes by use of the semiconductor laser is growing, and a demand for a thermosensitive recording sheet and a pressure-sensitive recording sheet which can absorb light in a near infrared region is also increasing.

A variety of such leuco dyes capable of absorbing light in a near infrared region and a variety of thermosensitive recording sheets and pressure-sensitive recording sheets using the above leuco dyes have been proposed recently. For example, phthalide compounds containing one or two vinyl groups are shown in Japanese Laid-Open Patent Applications 51-121035, 57-167979 and 58-157779, fluorene compounds shown in Japanese Laid-Open Patent Applications 59-199757 and 60-226871, fluoran compounds shown in Japanese Laid-Open Patent Application 62-74687, and sulfonylmethane compounds shown in Japanese Laid-Open Patent Application 60-231766.

However, the above leuco dyes have the shortcoming that their absorption intensity in the near infrared region is not enough. In addition to this shortcoming, they have the shortcomings that the image formation stability is poor, which may readily cause discoloration of colored images, and accordingly such colored images cannot be easily read by optical readers.

Furthermore, Japanese Laid-Open Patent Application 62-173287 discloses a thermosensitive recording material in which a leuco dye of the following formula is employed:

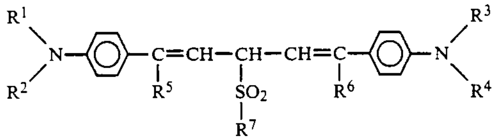

wherein $R^1$ to $R^4$ each represent a substituted or unsubstituted alkyl group; and $R^5$ to $R^7$ each represent a substituted or unsubstituted phenyl group.

The above leuco dye is similar in chemical structure to leuco dyes according to the present invention. However, the above recording material has the shortcomings that it is not resistant to light and the background of image areas is gradually discolored.

SUMMARY OF THE INVENTION

It is therefore an object of the present invention to provide novel leuco dyes for use in a recording material.

Another object of the present invention is to provide recording material using any of the above leuco dyes, which is capable of yielding colored images which sufficiently absorb light in a near infrared region with excellent preservability, and more particularly a recording material capable of yielding colored images which can be read by the light source covering a visible region through a near infrared region.

A further object of the present invention is to provide a dye-containing composition.

According to the present invention, the first object of the present invention can be attained by a leuco dye having the following formula (I), which is colored when brought into contact with a color developer capable of inducing color formation in the leuco dye:

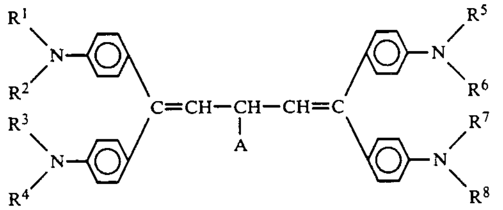
(I)

wherein $R^1$, $R^2$, $R^3$, $R^4$, $R^5$, $R^6$, $R^7$, and $R^8$ each represent a lower alkyl group; A represents

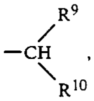
, in which $R^9$ and $R^{10}$ each represent hydrogen, provided that both $R^9$ and $R^{10}$ may not be hydrogen, —CN or —$COR^{14}$ in which $R^{14}$ represents a phenyl group which is unsubstituted or is substituted by an alkyl group such as a methyl group and an ethyl group, an alkoxyl group such as a methoxy group and an ethoxy group, and a halogen such as chlorine and bromine, a naphthyl group which is unsubstituted or is substituted by an alkyl group such as a methyl group and an ethyl group, an alkoxyl group such as a methoxy group and an ethoxy group, and a halogen such as chlorine and bromine, a lower alkyl group, or a lower alkoxyl group,

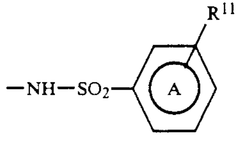

in which

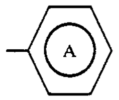

represents a phenyl group or a naphthyl group, $R^{11}$ hydrogen, a lower alkyl group, a halogen, an amino group, which is unsubstituted or is substituted by an alkyl group having 1 to 4 carbon atoms, or a nitrogroup, or

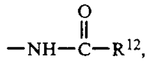

in which $R^{12}$ represents a lower alkyl group, or or

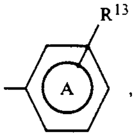

in which $R^{13}$ represents hydrogen, a lower alkyl group, a halogen, a hydroxyl group, a trifluoromethyl group, a nitro group, an amino group which is unsubstituted or is substituted by an alkyl group having 1 to 4 carbon atoms, or amide group.

The second object of the present invention can be attained by a recording material comprising at least one of the above-mentioned novel leuco dyes having the formula (I), which is colored when brought into contact with a color developer capable of inducing color formation in the leuco dye.

The third object of the present invention can be attained by a dye-containing composition comprising at least one leuco dye of the above formula (I) and at least one leuco dye capable of correcting the color tone or the light absorbing properties of the leuco dye of the formula (I) or by a dye-containing composition comprising at least one leuco dye of the formula (I) and at least one electron acceptor-color developer capable of inducing a coloring reaction when in contact with the leuco dye of the formula (I).

DETAILED DESCRIPTION OF THE PREFERRED EMBODIMENTS

In the leuco dyes of the above formula (I) according to the present invention, preferable leuco dyes are of the formula (I) in which A is

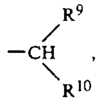

more preferable leuco dyes are of the formula (I) in which the above $R^9$ and $R^{10}$ are $-COR^{14}$, and most preferable leuco dyes are of the formula (I) in which the above $R^{14}$ is a lower alkoxyl group.

Further in the above formula (I), preferable examples of $R^1$ to $R^8$ are an alkyl group having 1 to 4 carbon atoms such as a methyl group, an ethyl group, a propyl group, an isopropyl group, a butyl group and an isobutyl group.

Preferable examples of $R^{11}$ are hydrogen; an alkyl group having 1 to 4 carbon atoms such as a methyl group, an ethyl group, a propyl group, an isopropyl group, a butyl group and an isobutyl group; halogen such as chlorine and bromine; an amino group; a dialkylamino group with each alkyl group thereof having 1 to 4 carbon atoms, such as a dimethylamino group and a diethylamino group; and a nitro group.

Preferable examples of $R^{12}$ are an alkyl group having 1 to 4 carbon atoms, such as a methyl group, an ethyl group, a propyl group, and a butyl group; and an aryl group such as a phenyl group and a naphthyl group.

Preferable examples of $R^{13}$ are hydrogen, a lower alkyl group having 1 to 6 carbon atoms, such as a methyl group, an ethyl group, a propyl group, and a butyl group, a halogen such as chlorine and bromine, a hydroxyl group, a trifluoromethyl group, a nitro group, an amino group, an amino group having at least one lower alkyl group substituent having 1 to 4 carbon atoms such as a dimethyl amino group and a diethylamino group, and an amide group.

The leuco dyes having the general formula (I) for use in the present invention, which are novel materials available in the form of a light-yellow or light-brown solid, can be synthesized as follows:

A salt of 1,1,5,5-tetrakis(p-dialkylamionophenyl)2,4-pentadiene of formula (II) is caused to react with any of the compounds of formulae III) to (V) in an organic solvent such as dimethylformamide, dimethyl sulfoxide and dioxane, with stirring, at a temperature ranging from 0° C. to 200° C. for several hours.

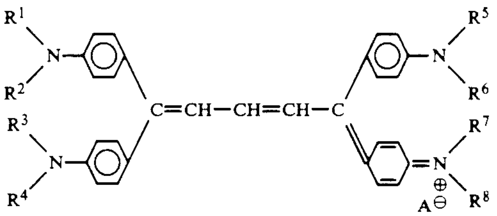

(II)

wherein $R^1$ to $R^8$ each represent the previously defined lower alkyl group in formula (I), and $A^\ominus$ represents an anion derived from an inorganic acid or an organic acid, such as $I^\ominus$, $ClO_4^\ominus$, or a carboxylic acid anion (e.g. acetate etc.).

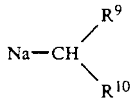

(III)

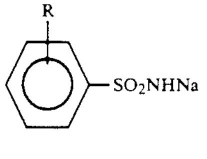

(IV)

-continued

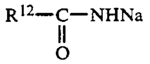

(V)

wherein $R^9$, $R^{10}$, $R^{11}$ and $R^{12}$ are respectively the same as those previously defined in formula (I).

The above reaction mixture is cooled to room temperature and then poured into ice water. Crystals separate out. The separated crystals are filtered off, washed with water and dried under reduced pressure. The thus obtained crystals are then recrystallized from a solvent such as acetone and ethyl acetate, whereby a leuco dye of the formula (I) can be obtained.

A synthesis example of a salt of 1,1,5,5-tetrakis(p-dialkylaminophenyl)-2,4-pentadiene of the above formula (II) is described in Journal of the American Chemical Society, Vol. 80, page 3772 (1958).

The thus obtained leuco dyes of general formula I) are novel compounds, which are stable in the air, and colorless or lightly colored solids. When the leuco dyes come into molecular-level contact with electron accepting compounds, for example, inorganic acid such as activated clay and terra alba, organic acids, phenolic compounds and derivatives thereof, a color inducing reaction quickly occurs, so that a deep blue color is induced in the leuco dye. The thus formed blue dye has excellent preservability, so that the leuco dyes are useful as a precursor of the blue dyes. The max of the light absorption spectrum of the dyes are in the range of about 800 to 820 nm in a solvent, and the light absorption spectrum of the dyes when colored on a sheet of paper is in the range of about 500 to 900 nm.

Specific examples of the leuco dyes represented by the above formula I) for use in the present invention are as follows, but the leuco dyes of the formula (I) for use in the present invention are not limited to the following:

Of the leuco dyes, those prepared by the reaction between a salt of 1,1,5,5-tetrakis(p-dialkylaminophenyl)2,4-pentadiene of the formula (II) and the compound of the formula (III) are the following Leuco Dyes No. 1 to No. 45:

1,5,5-tetra-(p-dimethylaminophenyl)-1,4-pentadiene-3-malononitrile Leuco Dye No.1),
1,1,5,5-tetra-(p-diethylaminophenyl)-1,4-pentadiene-3-malononitrile (Leuco Dye No. 2),
1,1,5,5-tetra-(p-dipropylaminophenyl)-1,4-pentadiene-3-malononitrile Leuco Dye No. 3),
1,1,5,5-tetra-(p-di-n-butylaminophenyl)-1,4-pentadiene-3-malononitrile (Leuco Dye No. 4),
1,1,5,5-tetra-(p-dimethylaminophenyl)-1,4-pentadiene-3-ethyl cyanoacetate (Leuco Dye No. 5),
1,1,5,5-tetra-(p-diethylaminophenyl)-1,4-pentadiene-3-ethyl cyanoacetate (Leuco Dye No. 6),
1,1,5,5-tetra-(p-dipropylaminophenyl)-1,4-pentadiene-3-ethyl cyanoacetate (Leuco Dye No. 7),
1,1,5,5-tetra-p-di-n-butylaminophenyl)-1,4-pentadiene-3-ethyl cyanoacetate (Leuco Dye No. 8),
1,1,5,5-tetra-(p-dimethylaminophenyl)-1,4-pentadiene-3-benzoylmethane (Leuco Dye No. 9),
1,1,5,5-tetra-(p-diethylaminophenyl)-1,4-pentadiene-3-benzoylmethane Leuco Dye No. 10),
1,1,5,5-tetra-(p-dipropylaminophenyl)-1,4-pentadiene-3-benzoylmethane Leuco Dye No. 11),
1,1,5,5-tetra-(p-di-n-butylaminophenyl)-1,4-pentadiene-3-benzoylmethane (Leuco Dye No. 12),
1,1,5,5-tetra-(p-dimethylaminophenyl)-1,4-pentadiene-3-dibenzoylmethane (Leuco Dye No. 13),
1,1,5,5-tetra-(p-diethylaminophenyl)-1,4-pentadiene-3-dibenzoylmethane (Leuco Dye No. 14),
1,1,5,5-tetra-(p-dipropylaminophenyl)-1,4-pentadiene-3-dibenzoylmethane (Leuco Dye No. 15),
1,1,5,5-tetra-(p-di-n-butylaminophenyl)-1,4-pentadiene-3-dibenzoylmethane Leuco Dye No. 16),
1,1,5,5-tetra-(p-dimethylaminophenyl)-1,4-pentadiene-3-p-chlorobenzoylmethane (Leuco Dye No. 17),
1,1,5,5-tetra-(p-diethylaminophenyl)-1,4-pentadiene-3-p-chlorobenzoylmethane (Leuco Dye No. 18),
1,1,5,5-tetra-(p-dipropylaminophenyl)-1,4-pentadiene-3-p-chlorobenzoylmethane (Leuco Dye No. 19),
1,1,5,5-tetra-(p-di-n-butylaminophenyl)-1,4-pentadiene-3-p-chlorobenzoylmethane (Leuco Dye No. 20),
1,1,5,5-tetra-(p-dimethylaminophenyl)-1,4-pentadiene-3-β-naphthoylmethane (Leuco Dye No. 21),
1,1,5,5-tetra-(p-diethylaminophenyl)-1,4-pentadiene-3-β-naphthoylmethane (Leuco Dye No. 22),
1,1,5,5-tetra-(p-dipropylaminophenyl)-1,4-pentadiene-3-β-naphthoylmethane (Leuco Dye No. 23),
1,1,5,5-tetra-(p-di-n-butylaminophenyl)-1,4-pentadiene-3-β-naphthoylmethane (Leuco Dye No. 24),
1,1,5,5-tetra-(p-dimethylaminophenyl)-1,4-pentadiene-3-diacetylmethane (Leuco Dye No. 25),
1,1,5,5-tetra-(p-diethylaminophenyl)-1,4-pentadiene-3-diacetylmethane (Leuco Dye No. 26),
1,1,5,5-tetra-(p-dipropylaminophenyl)-1,4-pentadiene-3-diacetylmethane (Leuco Dye No. 27),
1,1,5,5-tetra-(p-di-n-butylaminophenyl)-1,4-pentadiene-3-diacetylmethane (Leuco Dye No. 28),
1,1,5,5-tetra-(p-dimethylaminophenyl)-1,4-pentadiene-3-dimethyl malonate (Leuco Dye No. 29),
1,1,5,5-tetra-(p-diethylaminophenyl)-1,4-pentadiene-3-dimethyl malonate (Leuco Dye No. 30),
1,1,5,5-tetra-(p-dipropylaminophenyl)-1,4-pentadiene-3-dimethyl malonate (Leuco Dye No. 31),
1,1,5,5-tetra-(p-di-n-butylaminophenyl)-1,4-pentadiene-3-dimethyl malonate (Leuco Dye No. 32),
1,1,5,5-tetra-(p-dimethylaminophenyl)-1,4-pentadiene-3-diethyl malonate (Leuco Dye No. 33),
1,1,5,5-tetra-(p-diethylaminophenyl)-1,4-pentadiene-3-diethyl malonate (Leuco Dye No. 34),
1,1,5,5-tetra-(p-dipropylaminophenyl)-1,4-pentadiene-3-diethyl malonate Leuco Dye No. 35),
1,1,5,5-tetra-(p-di-n-butylaminophenyl)-1,4-pentadiene-3-diethyl malonate (Leuco Dye No. 36),
1,1,5,5-tetra-(p-dimethylaminophenyl)-1,4-pentadiene-3-di-isopropyl malonate (Leuco Dye No. 37),
1,1,5,5-tetra-(p-diethylaminophenyl)-1,4-pentadiene-3-di-isopropyl malonate (Leuco Dye No. 38),
1,1,5,5-tetra-(p-dipropylaminophenyl)-1,4-pentadiene-3-di-isopropyl malonate Leuco Dye No. 39),
1,1,5,5-tetra-(p-di-n-butylaminophenyl)-1,4-pentadiene-3-di-isopropyl malonate (Leuco Dye No. 40),
1,1,5,5-tetra-(p-dimethylaminophenyl)-1,4-pentadiene-3-di-n-butyl malonate (Leuco Dye No. 41),
1,1,5,5-tetra-(p-diethylaminophenyl)-1,4-pentadiene-3-di-n-butyl malonate Leuco Dye No. 42),
1,1,5,5-tetra-(p-dipropylaminophenyl)-1,4-pentadiene-3-di-n-butyl malonate (Leuco Dye No. 43), and
1,1,5,5-tetra-(p-di-n-butylaminophenyl)-1,4-pentadiene-3-di-n-butyl malonate (Leuco Dye No. 44).

Examples of the leuco dyes prepared by the reaction between a salt of 1,1,5,5-tetrakis(p-dialkylaminophenyl)-2,4-pentadiene of the formula (II) and the compound of the formula IV) are the following Leuco Dyes No. 45 to No. 59:

1,1,5,5-tetra-(p-dimethylaminophenyl)-1,4-pentadiene-3-p-toluenesulfonamide (Leuco Dye No. 45),
1,1,5,5-tetra-(p-dimethylaminophenyl)-1,4-pentadiene-3-o-toluenesulfonamide (Leuco Dye No. 46),
1,1,5,5-tetra-(p-dimethylaminophenyl)-1,4-pentadiene-3-benzenesulfonamide (Leuco Dye No. 47),
1,1,5,5-tetra-(p-diethylaminophenyl)-1,4-pentadiene-3-p-toluenesulfonamide (Leuco Dye No. 48),
1,1,5,5-tetra-(p-diethylaminophenyl)-1,4-pentadiene-3-o-toluenesulfonamide (Leuco Dye No. 49),
1,1,5,5-tetra-(p-diethylaminophenyl)-1,4-pentadiene-3-benzenesulfonamide Leuco Dye No. 50),
1,1,5,5-tetra-(p-dimethylaminophenyl)-1,4-pentadiene-3-p-3-chlorobenzenesulfonamide (Leuco Dye No. 51),
1,1,5,5-tetra-(p-dimethylaminophenyl)-1,4-pentadiene-3-o-aminobenzenesulfonamide (Leuco Dye No. 52),
1,1,5,5-tetra-(p-dimethylaminophenyl)-1,4-pentadiene-3-p-aminobenzenesulfonamide (Leuco Dye No. 53),
1,1,5,5-tetra-(p-dimethylaminophenyl)-1,4-pentadiene-3-p-3-dimethylaminobenzenesulfonamide (Leuco Dye No. 54),
1,1,5,5-tetra-(p-dimethylaminophenyl)-1,4-pentadiene-3-p-nitrobenzenesulfonamide (Leuco Dye No. 55),
1,1,5,5-tetra-(p-dimethylaminophenyl)-1,4-pentadiene-3-α-naphthalenesulfonamide (Leuco Dye No. 56),
1,1,5,5-tetra-p-dimethylaminophenyl)-1,4-pentadiene-3-β-naphthalenesulfonamide (Leuco Dye No. 57),
1,1,5,5-tetra-(p-diethylaminophenyl)-1,4-pentadiene-3-α-naphthalenesulfonamide (Leuco Dye No. 58), and
1,1,5,5-tetra-(p-diethylaminophenyl)-1,4-pentadiene-3-β-naphthalenesulfonamide (Leuco Dye No. 59).

Examples of the leuco dyes prepared by the reaction between a salt of 1,1,5,5-tetrakis(p-dialkylaminophenyl)-2,4-pentadiene of the formula (II) and the compound of the formula (V) are the following Leuco Dyes No. 60 to No. 79:

1,1,5,5-tetra-(p-dimethylaminophenyl)-1,4-pentadiene-3-valeramide (Leuco Dye No. 60),
1,1,5,5-tetra-(p-dimethylaminophenyl)-1,4-pentadiene-3-benzamide (Leuco Dye No. 61),
1,1,5,5-tetra-(p-diethylaminophenyl)-1,4-pentadiene-3-benzamide (Leuco Dye No. 62),
1,1,5,5-tetra-(p-dimethylaminophenyl)-1,4-pentadiene-3-p-methylbenzamide (Leuco Dye No. 63),
1,1,5,5-tetra-(p-diethylaminophenyl)-1,4-pentadiene-3-p-methylbenzamide (Leuco Dye No. 64),
1,1,5,5-tetra-(p-dimethylaminophenyl)-1,4-pentadiene-3-p-chlorobenzamide (Leuco Dye No. 65),
1,1,5,5-tetra-(p-diethylaminophenyl)-1,4-pentadiene-3-p-chlorobenzamide (Leuco Dye No. 66),
1,1,5,5-tetra-(p-dimethylaminophenyl)-1,4-pentadiene-3-p-trifluoromethylbenzamide (Leuco Dye No. 67),
1,1,5,5-tetra-(p-diethylaminophenyl)-1,4-pentadiene-3-p-trifluoromethylbenzamide (Leuco Dye No. 68),
1,1,5,5-tetra-(p-dimethylaminophenyl)-1,4-pentadiene-3-p-hydroxybenzamide (Leuco Dye No. 69),
1,1,5,5-tetra-(p-dimethylaminophenyl)-1,4-pentadiene-3-p-aminobenzamide (Leuco Dye No. 70),
1,1,5,5-tetra-(p-dimethylaminophenyl)-1,4-pentadiene-3-p-nitrobenzamide (Leuco Dye No. 71),
1,1,5,5-tetra-(p-dimethylaminophenyl)-1,4-pentadiene-3-p-dimethylaminobenzamide (Leuco Dye No. 72),
1,1,5,5-tetra-p-dimethylaminophenyl)-1,4-pentadiene-3-o-methylbenzamide (Leuco Dye No. 73),
1,1,5,5-tetra-(p-dimethylaminophenyl)-1,4-pentadiene-3-o-chlorobenzamide Leuco Dye No. 74),
1,1,5,5-tetra-(p-dimethylaminophenyl)-1,4-pentadiene-3-p-aminobenzamide (Leuco Dye No. 75),
1,1,5,5-tetra-(p-dimethylaminophenyl)-1,4-pentadiene-3-α-naphthobenzamide (Leuco Dye No. 76),
1,1,5,5-tetra-(p-dimethylaminophenyl)-1,4-pentadiene-3-β-naphthobenzamide (Leuco Dye No. 77),
1,1,5,5-tetra-(p-diethylaminophenyl)-1,4-pentadiene-3-α-naphthobenzamide (Leuco Dye No. 78), and
1,1,5,5-tetra-(p-diethylaminophenyl)-1,4-pentadiene-3-β-naphthobenzamide (Leuco Dye No. 79).

The leuco dyes of the formula (I) according to the present invention can be employed not only as coloring agents for thermosensitive recording materials and pressure sensitive recording materials, but also as coloring agents for thermal image transfer type recording materials in the same manner as in the case of the conventional leuco dyes.

Since the color tones produced by the color formation in the leuco dyes having the general formula (I) for use in the present invention range from dark blue to reddish black, the combination with other leuco dyes is effective for the correction of the color tone or the light absorption properties. For example, by the above leuco dyes in combination with a black dye, black images having a further improved absorption intensity in a near infrared region can be obtained.

As the above-mentioned leuco dyes, which may be employed in combination with the leuco dyes for use in the present invention, any conventional leuco dyes used in conventional thermosensitive materials can be employed For example, triphenylmethane-type leuco compounds, fluoran-type leuco compounds, phenothiazine-type leuco compounds, auramine-type leuco compounds and spiropyran-type leuco compounds are preferably employed It is preferable that the ratio of the amount of such conventional leuco dyes to the amount of any of the leuco dyes of the present invention be in the range of (1:9) to 9:1).

Specific examples of those leuco dyes are as follows:

3,3-bis(p-dimethylaminophenyl)-phthalide,
3,3-bis(p-dimethylaminophenyl)-6-dimethylaminophthalide (or Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzofluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)xanthylbenzoic acid lactam],
3-diethylamino-6-methyl-7-(m-trichloromerhylanilino)-fluoran,
3-diethylamino-7-(o-chloroanilino)fluoran,
3-dibutylamino-7-(o-chloroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-(N,N-diethylamino)-5-methyl-7-(N,N-dibenzylamino) fluoran, Benzoyl leuco methylene blue,
6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5'chlorophenyl)phthalide,
3-(2'-hydroxy-4'-dimethylaminophenyl)-3-2'-methoxy-5'nitrophenyl)phthalide,
3-(2'-hydroxy-4'-dimethylaminophenyl)-3-(2'-hydroxy-5'methylphenyl)phthalide,
3-(2'-methoxy-4'-dimethylaminophenyl)-3-(2'-hydroxy-4'-chloro-5'-methylphenyl)phthalide,
3-morpholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino)-fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino)-fluoran,
3-(N-benzyl-N-cyclohexylamino)-5,6-benzo-7-α-naphthyl-amino-4'-bromofluoran,
3-diethylamino-6-methyl-7-mesidino-4',5'benzofluoran, and
3-diethylamino-6-methyl-7-2',4'-dimethylanilino) fluoran.

Of the above leuco dyes, a preferable leuco dye is, for example, 3-(N-cyclohexyl-N'-methyl)amino-6-methyl-7-anilinofuran, which produces a black color tone. This leuco dye is commercially available with a trademark of "PSD-150" for Nippon Soda Co., Ltd. In addition to the above, 3-diethylamino-7-(o-chloroanilino)fluoran, 3-dibutylamino-7-(o-chloroanilino)fluoran, 3-N-methyl-N-amylamino-6-methyl-7-anilinofluoran, and 3-diethylamino-6-methyl-7-anilinofluoran are also preferable for use in the present invention.

As the color developers for use in combination with the above leuco dyes in the present invention, a variety of electron acceptors or oxidizing agents capable of inducing color formation in the leuco dyes can be employed.

In order to develop an adequate color, it is preferable that the amount of the color developer to the leuco dye of the present invention to be combined therewith be in the range of 1 to 5) : 1.

Specific examples of such conventional color developers are inorganic acids, organic acids, phenolic materials and phenolic resins, for example:
bentonite,
zeolite,
acidic terra alba,
activated clay,
silica gel,
phenolic resin,
4,4'-isopropylidenebisphenol,
4,4'-isopropylidenebis(o-methylphenol),
4,4'-sec-butylidenebisphenol,
4,4'-isopropylidenebis(o-tert-butylphenol),
4,4'-cyclohexylidenebisphenol, u
4,4'-isopropylidenebis(2-chlorophenol),
2,2'-methylenebis(4-methyl-6-tert-butylphenol),
2,2'-methylenebis(4-ethyl-6-tert-butylphenol),
4,4'-butylidenebis6-tert-butyl-2-methylphenol),
1,1,3-tris(2-methyl-4-hydroxy-5-tert-butylphenyl) butane,
1,1,3-tris(2-methyl-4-hydroxy-5-cyclohexylphenyl) butane,
4,4'-thiobis(6-tert-butyl-2-methylphenol),
4,4'-diphenolsulfone,
4,2'-diphenolsulfone,
4-isopropoxy-4'-hydroxydiphenylsulfone:,
4-benzyloxy-4'-hydroxydiphenylsulfone,
4,4'-diphenolsulfoxide,
isopropyl p-hydroxybenzoate,
benzyl p-hydroxybenzoate,
benzyl protocarechuate,
stearyl gallate,
lauryl gallate,
octyl gallate,
1,7-bis(4-hydroxyphenylthio)-3,5-dioxaheptane,
1,5-bis(4-hydroxyphenylthio)-3-oxapentane,
1,3-bis(4-hydroxyphenylthio)-propane,
2,2'-methylenebis(4-ethyl-6-tert-butylphenol),
1,3-bis(4-hydroxyphenylthio)-2-hydroxypropane,
N,N'-diphenylthiourea,
N,N'-di(m-chlorophenyl)thiourea,
salicylanilide,
5-chloro-salicylanilide,
salicyl-o-chloroanilide,
2-hydroxy-3-naphthoic acid,
antipyrine complex of zinc thiocyanate,
zinc 2-acetyloxy-3-naphthoate,
2-hydroxy-1-naphthoic acid,
1-hydroxy-2-naphthoic acid,
zinc hydroxynaphthoate,
aluminum hydroxynaphthoate,
calcium hydroxynaphthoate,
ethyl protocatechuate,
bis(4-hydroxyphenyl)methyl acetate,
bis(4-hydroxyphenyl)benzyl acetate,
1,3-bis(4-hydroxycumyl)benzene,
1,4-bis(4-hydroxycumyl)benzene,
2,4'-diphensolsulfone,
3,3'-diallyl-4,4'-diphenolsulfone,
α,α-bis(4-hydroxyphenyl)-α-methyltoluene,
antipyrine complex of zinc thiocyanate,
tetrabromobisphenol A,
tetrabromobisphenol S, and
3,4-dihydroxy-4'-methyldiphenylsulfone. Of the above color developers, particularly preferable color developers are gallic acid esters, such as esters between gallic acid and a $C_1$-$C_{22}$ long chain fatty acid, particularly, stearyl gallate, lauryl gallate and octyl gallate, and ethyl protocatechuate.

In order to obtain a thermosensitive recording material according to the present invention, a variety of conventional binder agents can be employed for binding the above-mentioned leuco dyes and color developers to a substrate of the thermosensitive recording material.

In the present invention, it is preferable that the ratio of the amount of the leuco dye of the present invention to the amount of binder agents be in the range of 1 : (0.1 to 5).

Further, in order to obtain a pressure-sensitive recording material according to the present invention, the same binder agents can also be employed for fixing the leuco dyes in the form of microcapsules and the color developers to the substrate of the pressure-sensitive recording material.

Specific examples of the above binder agents are polyyinyl alcohol; starch, starch derivatives; cellulose derivatives such as hydroxyethylcellulose, carboxymethylcellulose, methylcellulose and ethylcellulose; water-soluble polymers such as sodium polyacrylate, polyvinyl pyrrolidone, acrylamide - acrylic acid ester copolymer, acrylamide-acrylic acid ester - methacrylic acid copolymer, alkali salts of styrene - maleic anhydride copolymer, alkali salts of isobutylene - maleic anhydride copolymer, polyacrylamide, sodium alginate, gelatin and casein; and latexes of polyvinyl acetate, polyurethane, styrene - butadiene copolymer, polyacrylic acid, polyacrylic acid esrer, vinyl chloride - vinyl acetate copolymer, polybutylmethacrylate, ethylene - vinyl acetate copolymer and styrene - butadiene-acrylic acid derivative copolymer.

Further in the present invention, auxiliary additive components which are used in the conventional thermosensitive and pressure-sensitive recording materials, such as fillers, surface active agents, thermofusible materials, lubricants and agents for preventing color formation by pressure application, can be employed, together with the above-mentioned leuco dyes and color developers.

In the present invention, surface active agents may be in a trace amount relative to the leuco dye of the present invention, and the amount of thermofusible materials may be in the range of 0.1 to 1 part by weight to 1 part by weight of the leuco dye of the present invention.

Specific examples of the filler for use in the present invention are finely-divided inorganic powders of calcium carbonate, silica, zinc oxide, titanium oxide, aluminum hydroxide, zinc hydroxide, barium sulfate, clay, talc, a surface-treated calcium compound and surface-treated silicate, and finely-divided organic powders of urea formaldehyde resin, styrene - methacrylic acid copolymer and polystyrene resin.

As the lubricant, for example, higher fatty acids, esters, amides and metallic salts thereof, and a variety of waxes such as animal, vegetable, mineral and petroleum can be used.

A pressure-sensitive recording material by use of the leuco dyes according to the present invention can be prepared, for example as follows:

The above-mentioned color developer is dispersed and dissolved in water or an organic solvent by means of an appropriate dispersant. To the thus prepared dispersion, an appropriate binder agent is added when necessary, and this dispersion is coated on a substrate such as a sheet of paper, so that a color developer sheet is obtained. On the other hand, a dye forming sheet is prepared by dispersing the above leuco dye in the form of a microcapsule by means of an appropriate dispersant and coating this dispersion on a substrate such as a sheet of paper Such a microcapsule can be prepared by the conventional methods, for instance, by the method described in U.S. Pat. No. 2,800,457.

A thermosensitive recording material by use of the leuco dyes according to the present invention can be prepared, for example as follows:

The leuco dye and the color developer, which are separately dispersed, are mixed with addition of an appropriate binder agent The thus prepared mixture is coated on a substrate such as a sheet of paper.

In this thermosensitive recording material, the coloring layer may be formed by coating a coating liquid at a time or two times separately to form one coloring layer or two coloring layers It is preferable that the total deposition of the coloring layer(s) be in the range of 3 to 10 $g/m^2$. Furthermore, a leuco dye layer and a color developer layer may be separately coated on the substrate.

An undercoat layer and/or a protective layer may be provided as known in the preparation of conventional thermosensitive recording materials. It is preferable that the deposition of an undercoat layer for use in the present invention be in the range of 1 to 2 $g/m^2$, and the deposition of a protective layer for use in the present invention be in the range of 1 to 5 $g/m^2$. The undercoat layer and the protective layer may be prepared by use of the same binder resins as those employed for binding the leuco dyes and color developers for the thermosensitive recording material according to the present invention.

According to the present invention, a thermal image transfer type recording material can be prepared by providing two substrates which comprise leuco dye and the color developer, separately. Specifically, the leuco dye is dispersed or dissolved in water or a solvent. This dispersion is coated on a conventionally employed heat-resistant substrate such as a polyester firm to form an image transfer sheet, while an image receiving sheet can be prepared by dispersing or dissolving the color developer in water or a solvent, and then coating this dispersion or solution on the other substrate.

The recording material according to the present invention can be employed in various fields just like conventional ones. In particular, since the leuco dyes contained in the recording material according to the present invention have the advantage of a sufficient absorption intensity in a near infrared region, such recording materials can be utilized for an optical character reading apparatus, label bar-code reader and bar-code reader.

When the recording material according to the present invention is used as a thermosensitive recording adhesive label sheet, a thermosensitive coloring layer comprising the above leuco dye and the color developer is formed on the front side of the substrate, and an adhesive layer is formed on the back side of the substrate, with a disposable backing sheet attached to the adhesive layer.

SYNTHESIS EXAMPLE 1

[Synthesis of α,α-bis(p-dimethylaminophenyl)ethylene]

4.2 g of magnesium and 50 ml of absolute diethyl ether were placed in a 1-liter four-necked flask and stirred. To this mixture, a mixed solution of 25 g of methyl iodide and 50 ml of absolute diethyl ether was slowly added dropwise at room temperature over a period of 90 minutes. After the addition of the mixed solution, the reaction mixture was refluxed for 1 hour, so that a Grignard agent was prepared.

To the Grignard agent placed in the four-necked flask, 500 ml of a benzene solution of 23.2 g of Michler's ketone (N,N'-tetramethyl-4,4'-diaminobenzophenone) was added dropwise over a period of 90 minutes, with the temperature kept at 15 to 20° C under ice cooling After the dropwise addition of the benzene solution of Michler's ketone, the reaction mixture was refluxed for 1 hour and then allowed to stand overnight.

This reaction mixture was slowly added to an ice-cooled aqueous solution containing 40.6 g of glacial acetic acid and 77.3 g of ammonium chloride. The mixture was stirred at room temperature for 2 hours and then allowed to stand for a while.

The reaction mixture separated into a benzene layer in which a reaction product was contained and a water layer. The benzene layer was separated from this reaction mixture, and the water layer was extracted with benzene to obtain the reaction product contained in the water layer. The benzene used for the extraction was mixed with the first separated benzene layer.

The thus obtained benzene solution was dehydrated by adding 30 g of calcium chloride $CaCl_2$) to the solution and allowing the mixture to stand overnight. The calcium chloride was then removed from the mixture by filtration. The resulting benzene solution was placed in a rotary evaporator and the benzene was then distilled away therfrom, whereby 13.6 g of a yellowish green solid residue was obtained. The yield was 59.0%. The melting point was 118.3 to 120.2° C.

The thus obtained residue was recrystallized from 200 ml of ethyl alcohol, so that α,α-bis(p-dinethylaminophenyl) ethylene was obtained in the form of a yellowish green powder. The yield was 9.48 g 41.1% of the theoretical amount). The melting point was 122.4 to 124° C.

SYNTHESIS EXAMPLE 2

Synthesis of 1,1,5,5-tetra-(p-dimethylaminophenyl)-2,4-pentadiene-1-ol perchlorate 26.64 g of α,α-bis(p-dimethylaminophenyl)ethylene prepared in Synthesis Example 1, 20 ml of triethyl orthoformate and 200 ml of acetic anhydride were placed in a 300-ml. Erlenmeyer flask and stirred. To this mixture, 7.18 g of a 70% aqueous solution of perchloric acid was slowly added dropwise. After the addition of perchloric acid, the mixture was refluxed for 90 minutes. During the course of the refluxing, crystals having metallic luster separated from the reaction mixture. When the reaction mixture was cooled, more crystals separated. The thus separated crystals were filtered off, washed with water several times and dried. Thus, 1,1,5,5-tetra-(p-dime-thylaminophenyl)2,4-pentadiene-1-ol perchlorate was obtained. The yield was 29.34 g (91% of the theoretical amount). The melting point was 237.5 to 238° C.

SYNTHESIS EXAMPLE 3

Synthesis of 1,1,5,5-tetra-(p-dimethylaminophenyl)-3--hydroxy-1,4-pentadiene 7.7 g of 1,1,5,5-tetra-p-dimethylaminophenyl)-2,4-pentadiene-1-ol perchlorate prepared in Synthesis Example 2 was dissolved in 100 ml of methanol. To this solution, 1.52 g of sodium hydroxide was added. The mixture was refluxed for 2 hours and then cooled. Crystals separated out in the reaction mixture. The crystals were filtered off, washed with water several times, and then with acetone, and dried, whereby 6.3 g of 1,1,5,5-tetra-(p-dimethylaminophenyl)-3-hydroxy-1,4-pentadiene was obtained in the form of almost white crystals. The melting point of the product was 147.5 to 148.5° C.

SYNTHESIS EXAMPLE 4

Synthesis of α,α-bis(p-diethylaminophenyl)ethylene 4.2 g of magnesium and 50 ml of absolute diethyl ether were placed in a 1-liter four-necked flask and stirred. To this mixture, a mixed solution of 25 g of methyl iodide and 50 ml of absolute diethyl ether was slowly added dropwise at room temperature over a period of 90 minutes. After the addition of the mixed solution, the reaction mixture was refluxed for 1 hour, so that a Grignard agent was prepared.

To the Grignard agent placed in the four-necked flask, 500 ml of a benzene solution of 28.0 g of 4,4'-diethylaminobenzophenone was added dropwise over a period of 90 minutes, with the temperature kept at 15 to 20° C under ice cooling. After the dropwise addition of the benzene solution of 4,4'-diethylaminobenzophenone, the reaction mixture was refluxed for 1 hour and then allowed to stand overnight.

This reaction mixture was slowly added to an ice-cooled aqueous solution containing 40.6 g of glacial acetic acid and 77.3 g of ammonium cloride The mixture was stirred at room temperature for 2 hours and then allowed to stand for a while.

The reaction mixture separated into a benzene layer in which a reaction product was contained and a water layer. The benzene layer was separated from this reaction mixture, and the water layer was extracted with benzene to obtain the reaction product contained in the water layer. The benzene used for the extraction was mixed with the first separated benzene layer.

The thus obtained benzene solution was dehydrated by adding 30 g of anhydrous sodium sulfate ($Na_2SO_4$) to the solution and allowing the mixture to stand overnight. The sodium sulfate was then removed from the mixture by filtration. The resulting benzene solution was placed in a rotary evaporator and the benzene was then distilled away therefrom, whereby 25.8 g of a light green liquid residue was obtained. The yield was 91.3%.

When this liquid residue was allowed to stand for a while, it crystallized. The thus crystallized residue was recrystallized from 400 ml of ethyl alcohol, so that α,α-bis(p-diethylaminophenyl) ethylene was obtained in the form of yellowish green plates. The yield was 22.1 g (79.4% of the theoretical amount). The melting point was 103 to 104° C.

SYNTHESIS EXAMPLE 5

Synthesis of 1,1,5,5-tetra-(p-diethylaminophenyl)-2,4-pentadiene-1-ol perchlorate 32.25 g of α,α-bis(p-diethylaminophenyl)ethylene prepared in Synthesis Example 4, 20 ml of triethyl orthoformate and 200 ml of acetic anhydride were placed in a 300-ml. Erlenmeyer flask and stirred. To this mixture, 7.18 g of a 70% aqueous solution of perchloric acid was slowly added dropwise. After the dropwise addition of perchloric acid, the mixture was refluxed for 90 minutes. The reaction mixture was poured into 400 ml of ice water. Crystals having metallic luster separated from the reaction mixture. The thus separated crystals were filtered off, washed with water several times and dried. Thus, 1,1,5,5-tetra-(p-diethylaminophenyl)-2,4-pentadiene-1-ol perchlorate was obtained. The yield was 26.2 g (69.4% of the theoretical amount). The product was decomposed at 190° C.

SYNTHESIS EXAMPLE 6

Synthesis of 1,1,5,5-tetra-p-diethylaminophenyl)-3-hydroxy-1,4-pentadiene 15.1 g of 1,1,5,5-tetra-(p-diethylaminophenyl)-2,4-pentadiene-1-ol perchlorate prepared in Synthesis Example 5 was dissolved in 200 ml of methanol. To this solution, 2.53 g of sodium hydroxide was added. The mixture was refluxed for 2 hours and then cooled. Crystals separated out in the reaction mixture. The crystals were filtered off, washed with water several times, and dried in reduced pressure. The crystals were recrystallized from cyclohexane, whereby 11.7 g of 1,1,5,5-tetra-(p-diethylaminophenyl)-3-hydroxy-1,4-pentadiene was obtained in the form of light green crystals. The melting point of the product was 136.5 to 137.5° C.

EXAMPLE 1-1

Synthesis of 1,1,5,5-tetra-(p-dimethylaminophenyl)-1,4-pentadiene-3-malononitrile (Leuco Dye No. 1)

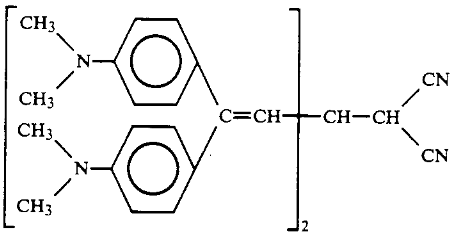

A mixture of 1.5 g of a 60% sodium hydride and 200 ml of N,N-dimethylformamide (DMF) was stirred at room temperature. To this mixture was slowly added 3.3 g of malononitrile. A hydrogen gas was generated from the reaction mixture. After the generation of the hydrogen gas was terminated, the reaction mixture was stirred for a while. To this mixture, 16.1 g of 1,1,5,5-tetra-(p-dimethylaminophenyl)-2,4-pentadiene-1-ol perchlorate was slowly added. This reaction mixture was stirred at room temperature for 3 hours. Then 300 ml of water was added to the reaction mixture. As a result, brown crystals separated from the reaction mixture. The crystals were filtered off, washed water and dried. The crystals were then stirred together with 200 ml of acetone for 1 hour and filtered off, so that 1,1,5,5-(p-dimethylaminophenyl)-1,4-pentadiene-3-malononitrile (Leuco Dye No. 1) according to the present invention, was obtained in the form of light red crystals. The yield was 9.1 g. The decomposition point was 191 to 195° C.

EXAMPLE 1-2

Synthesis of 1,1,5 5-tetra-p-dimethylamimophenyl)-1,4-- -pentadiene-3-ethyl cyanoacetate (Leuco Dye No. 5)

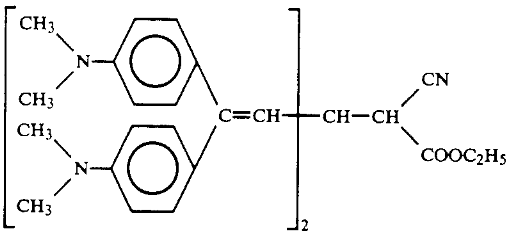

The procedure for Example 1-1 was repeated except that 3.3 g of malononitrile employed in Example 1-1 was replaced by 5.7 g of ehtyl cyanoacetate, whereby 1,1,5,5-tetra-(p-dimethylaminophenyl)-1,4-pentadiene-3-ethyl cyanoacetate (Leuco Dye No. 5) according to the present invention was obtained in the form of light red crystals. The yield was 10.2 g. The decomposition point of the compound was 180.5 to 183.5°C.

EXAMPLE 1-3

Synthesis of 1,1,5,5-tetra-p-dimethylaminophenyl)-1,4-pentadiene-3-benzolymethane (Leuco Dye No. 9)

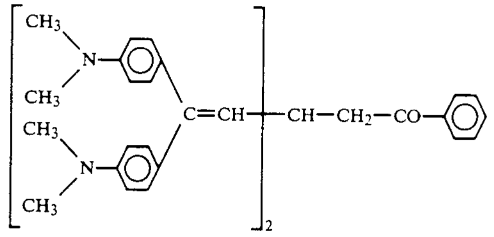

2.0 g a 60% sodium hydride was added to 100 ml of acetophenone. The mixture was stirred at room temperature for a while. To this mixture was added 16.1 g of 1,1,5,5-tetra-(p-dimethylaminophenyl)-2,4-pentadiene1-ol perchlorate, and the mixture was stirred at 55° C for 3 hours. To this reaction mixture, 100 ml cf water was added and the mixture was concentrated under reduced pressure to yield a tar-like residue. To this residue was added 200 ml of acetone, and the mixture was stirred for a while. Light orange crystals seprated out in the mixture. The crystals were filtered off and dried, whereby 1,1,5,5-tetra-(p-dimethylamino-phenyl)-1,4-pentadine-3-benzolymethane Leuco Dye No. 9) according to the present invention was obtained. The yield was 5.3 g. The melting point of the compound was 132.5 to 135° C.

EXAMPLE 1-4

Synthesis of 1,1,5,5-tetra-(p-dimethylaminophenyl)-1,4-pentadiene-3-p-chlorobenzoylmethane (Leuco Dye No. 16)

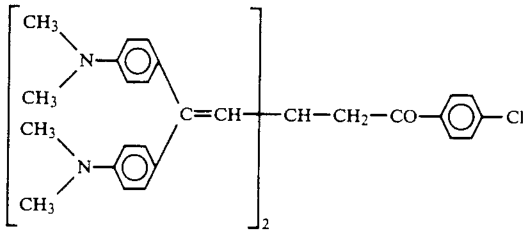

1.5 g of a 60% sodium hydride was added to 200 ml of dimethylformamide (DMF). The mixture was stirred at room temperature for a while. To this mixture was gradually added 7.73 g of p-chloroacetophenone. The mixture was stirred for a while. To this mixture, 16.1 g of 1,1,5,5-tetra-(p-dimethylaminophenyl)-2,4-pentadiene-1-ol perchlorate was added, and the mixture was stirred at 50° C for 3 hours. To this reaction mixture, 300 ml of water was added. A resinous material separated out in the mixture. The resinous material was washed with water, dried, added to 200 ml of acetone and stirred for a while. The resinous material crystallized. The crystals were filtered off and dried, whereby 1,1,5,5-tetra-(p-dimethyl-aminophenyl)-1,4-pentadiene-3-p-chlorobenzoylmethane (Leuco Dye No. 17) according to the present invention was obtained. The yield was 3.2 g. The melting point of the compound was 118 to 120.5° C.

EXAMPLE 1-5

Synthesis of 1,1,5,5-tetra-(p-dimethylaminophenyl)-1,4-pentadiene-8-naphthoylmethane (Leuco Dye No. 21)

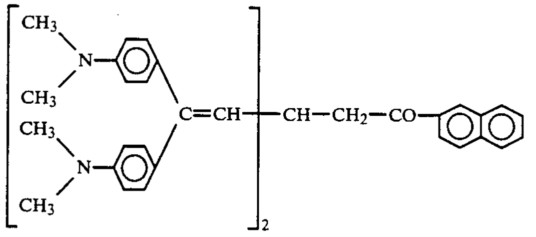

The procedure for Example 1-4 was repeated except that 7.73 g of p-chloroacetophenone employed in Example 1-4 was replaced by 8.5 g of 2-acetyl naphalene, whereby 1,1,5,5-tetra-(p-dimethylaminophenyl)-1,4-pentadiene-3-β-naphthoylmethane (Leuco Dye No. 21) according to the present invention was obtained in the form of light yellow crystals. The yield was 4.8 g. The melting point of the compound was 199 to 203° C.

EXAMPLE 1-6

Synthesis of 1,1,5,5-tetra-(p-dimethylaminophenyl)-1,4-pentadiene-diacetylmethane (Leuco Dye No. 25)

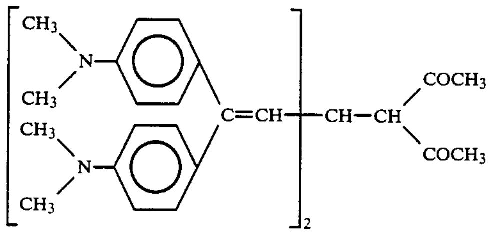

The procedure for Example 1-4 was repeated except that 7.73 g of p-chloroacetophenone employed in Example 1-4 was replaced by 5.9 g of acetylacetone, whereby 1,1,5,5-tetra(p-dimethylaminophenyl)-1,4-pentadiene-3-diacetylmethane (Leuco Dye No. 25) according to the present invention was obtained in the form of light yellow crystals. The yield was 4.6 g. The melting point of the compound was 108 to 110.5° C.

EXAMPLE 1-7

Synthesis of 1,1,5,5-tetra-(p-dimethylaminophenyl)-1,4-pentadiene-dibenzoylmethane (Leuco Dye No. 13)

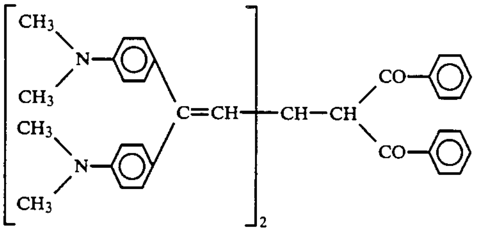

The procedure for Example 1-4 was repeated except that 7.73 g of p-chloroacetophenone employed in Example 1-4 was replaced by 11.2 g of dibenzoylmethane, whereby 1,1,5,5-tetra-(p-dimethylaminophenyl)-1,4-pentadiene-3-dibenzoylmethane (Leuco Dye No. 13) according to the present invention was obtained in the form of light yellowish green crystals. The yield was 15.8 g. The melting point of the compound was 107.5 to 108° C.

EXAMPLE 1-8

Synthesis of 1,1,5,5-tetra-(p-dimethylaminophenyl)-1,4-pentadiene-dimethyl malonate (Leuco Dye No. 29)

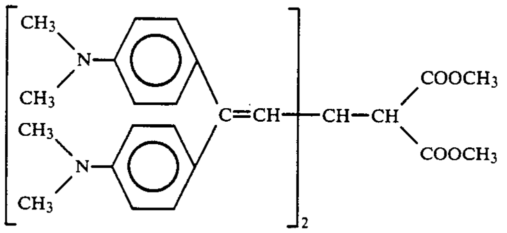

The procedure for Example 1-1 was repeated except that 3.3 g of malononitrile employed in Example 1-1 was replaced by 6.61 g of dimethyl malonate, whereby 1,1,5,5-tetra(p-dimethylaminophenyl)-1,4-pentadiene-3-dimethyl malonate (Leuco Dye No. 29) according to the present invention was obtaine din the form of very light yellowish green crystals. The yield was 11.5 g. The melting point of the compound was 159 to 161° C.

EXAMPLE 1-9

Synthesis of 1,1,5,5-tetra-(p-dimethylaminophenyl)-1,4-pentadiene-diethyl malonate (Leuco Dye No. 33)

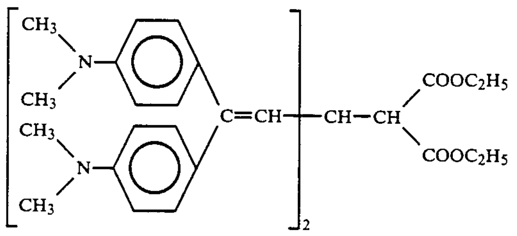

The procedure for Example 1-1 was repeated except that 3.3 g of malononitrile employed in Example 1-1 was replaced by 8.0 g of diethyl malonate, whereby 1,1,5-5-tetra-(p-dimethylaminophenyl)-1,4-pentadiene-3-diethyl malonate (Leuco Dye No. 33) according to the present invention was obtained in the form of very light yellowish green crystals. The yield was 15.8 g. The melting point of the compound was 151 to 152° C.

EXAMPLE 1-10

Synthesis of
1,1,5,5-tetra-(p-dimethylaminophenyl)-1,4-pentadiene-di-isopropyl malonate (Leuco Dye No. 37)

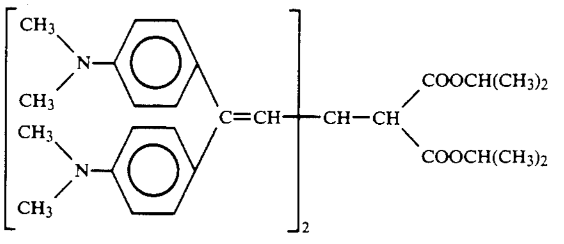

The synthesis reaction in Example 1-1 was repeated except that 3.3 g of malononitrile employed in Example 1-1 was replaced by 9.41 g of di-isopropyl malonate. After the reaction, when water was added to the reaction mixture, a resinous material was formed in the form of a lump. This resinous material was added 150 ml of acetone and the mixture was stirred for 1 hour and filtered off, whereby 1,1,5,5-tetra-(p-dimethylaminophenyl)-1,4-pentadiene-3-diisopropyl malonate (Leuco Dye No. 37) according to the present invention was obtained in the form of very light yellowish green crystals The yield was 13.8 g. The melting point of the compound was 141 to 143° C.

EXAMPLE 1-11

Synthesis of
1,1,5,5-tetra-(p-dimethylaminophenyl)-1,4-pentadiene-di-n-butyl malonate (Leuco Dye No. 41)

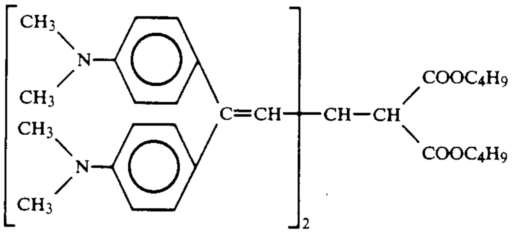

The synthesis reaction in Example 1-1 was repeated except that 3.3 g of malononitrile employed in Example 1-1 was replaced by 10.8 g of di-n-butyl malonate After the reaction, when water was added to the reaction mixture, a tar-like material was formed. This tar-like material was extracted with a mixed solvent consisting of n-hexane and acetone with a volume ratio thereof being 9 : 1 under application of heat thereto. When the extract liquid was allowed to stand for a while, yellow particle-like crystals separated out, which are filtered off and dried, whereby 1,1,5,5-tetra-(p-dimethylaminophenyl)-1,4-pentadiene-di-n-butyl malonate (Leuco Dye No. 41) according to the present invention was obtained in the form of yellow particle-like crystals. The yield was 10.7 g. The melting point of the compound was 112 to 114.5° C.

EXAMPLE 1-12

Synthesis of
1,1,5,5-tetra-(p-dimethylaminophenyl)-1,4-pentadiene-3-p-toluenesulfonamide (Leuco Dye No. 45)

2.8 g of 1,1,5,5-tetra-(p-dimethylaminophenyl)-3-hydroxy-1,4-pentadiene prepared in Synthesis Example 3, 4.28 g of p-toluene sulfonamide and 2.1 g of sodium hydrogencarbonate were dissolved in 100 ml of N,N-dimethylformamide (DMF). This reaction mixture was allowed to react at 80° C for 2 hours. After cooling the reaction mixture, the inorganic component was removed by filtration, and then the DMF was removed from the reaction mixture. The resulting residue was extracted with 200 ml of toluene. The extract liquid was washed well with warm water, dried with magnesium sulfate, and then the toluene was removed therefrom. The residue was then recrystallized from a mixed solvent of toluene and ethyl acetate, whereby 1,1,5,5-tetra-(p-dimethylaminophenyl)-1,4-pentadiene-3-p-toluenesulfonamide (Leuco Dye No. 45) according to the present invention was obtained in the form of light yellow green crystals. The yield was 2.1 g. The melting point was 168.5 to 169° C. The characteristic absorption bands in the visible light absorption spectrum and the infrared spectrum of the thus obtained product was respectively as follows:

Visible light absorption spectrum:
λmax (acetic acid): 809 nm, ε: $1.28\times10^5$.,
638 nm, ε: $4.08\times10^4$.
Infrared light absorption spectrum (by KBr tablet):
3290 $cm^{-1}$ νNH, 2890 $cm^{-1}$ νs $CH_3$,
1610 $cm^{-1}$ νC=C, 1520 $cm^{-1}$, benzene core,
1360 $cm^{-1}$ νas $SO_2$, 1165 $cm^{-1}$ νs $SO_2$.

EXAMPLE 1-13

Synthesis of
1,1,5,5-tetra-(p-dimethylaminophenyl)-1,4-pentadiene-3-o-toluenesulfonamide (Leuco Dye No. 46)

3.8 g of 1,1,5,5-tetra-(p-dimethylaminophenyl)-3-hydroxy-1,4-pentadiene prepared in Synthesis Example 6, 4.28 g of o-toluene sulfonamide and 2.1 g of sodium hydrogen-barbonate were dissolved in 100 ml of N,N-dimethylformamide (DMF). This reaction mixture was allowed to react at 80° C for 2 hours. After cooling the reacton mixture, the inorganic component was removed by filtration, and then the DMF was removed from the reaction mixture The resulting residue was extracted with 200 ml of toluene. The extract liquid was washed well with warm water, dried with magnesium sulfate, and then the toluene was removed therefrom. The residue was then recreystallized from a mixed solvent of toluene and ethyl acetate, whereby 1,1,5,5-tetra-(p-dimethylaminophenyl)-1,4-pentadiene-3-o-toluene-sulfonamide (Leuco Dye No. 46) according to the present invention was obtained in the form of light yellow green crystals. The yield was 3.4 g. The melting point was 108 to 109° C. The characteristic absorption bands in the visible light absorption spectrum and the infrared spectrum of the thus obtained product were respectively as follows:

Visible light absorption spectrum:
λmax (acetic acid) 815 nm, ε: $1.76\times10^4$;
660 nm, ε: $6.85\times10^3$.
Infrared light absorption spectrum (by KBr tablet):
3290 $cm^{-1}$ νNH, 2960 $cm^{-1}$ νas $CH_3$,
2925 $cm^{-1}$ νas $CH_2$, 2890 $cm^{-1}$ νs $CH_3$,
2850 $cm^{-1}$ νs $CH_2$, 1610 $cm^{-1}$ νC=C.
1520 $cm^{-1}$, benzene core, 1360 $cm^{-1}$ νas $SO_2$,
1165 $cm^{-1}$ νs $SO_2$.

EXAMPLE 1-14

Synthesis of 1,1,5,5-tetra-(p-dimethylaminophenyl)-1,4-pentadiene-3-p-3-chlorobenzenesulfonamide (Leuco Dye No. 51)

2.8 g of 1,1,5,5-tetra-(p-dimethylaminophenyl)-3- hydroxy-1,4-pentadiene prepared in Synthesis Example 3, 4.8 g of p-chlorobenzene sulfonamide and 2.1 g of sodium hydrogencarbonate were dissolved in 100 ml of N,N-dimethylformamide (DMF). This reaction mixture was allowed to react at 80° C for 2 hours. After cooling the reaction mixture, the inorganic component was removed by filtratin, and then the DMF was removed from the reaction mixture. The resulting residue was extracted with 200 ml of toluene. The extract liquid was washed well with warm water, dried with magnesium sulfate, and then the toluene was removed therefrom. The residue was then recrystallized from a mixed solvent of toluene and ethyl acetate, whereby 1,1,5,5-tetra-(p-dimethylaminophenyl)-1,4-pentadiene-3-p-chlorobenzene sulfonamide (Leuco Dye No. 51) according to the present invention was obtained in the form of light yellow green crystals. The yield was 3.1 g. The melting point was 167 to 168° C. The characteristic absorption bands in the visible light absorption spectrum and the infrared spectrum of the thus obtained product were respectively as follows:

Visible light absorption spectrum:
λmax (acetic acid); 805 nm, ε: $7.88\times10^4$;
632 nm, ε: $2.53\times10^4$.
Infrared light absorption spectrum by KBr tablet)
3290 $cm^{-1}$ νNH, 2890 $cm^{-1}$ νs $CH_3$,
1610 $cm^{-1}$ νC=C, 1520 $cm^{-1}$, benzene core,
1360 $cm^{-1}$ νas $SO_2$, 1165 $cm^{-1}$ ννs $SO_2$.

EXAMPLE 1-15

Synthesis of 1,1,5,5-tetra-(p-dimethylaminophenyl)-1,4-pentadiene-3-α-naphthalenesulfonamide (Leuco Dye No. 56)

2.8 g of 1,1,5,5-tetra-(p-dimethylaminophenyl)-3-hydroxy-1,4-pentadiene prepared in Synthesis Example 3, 5.18 g of α-naphthalene sulfonamide and 2.1 g of sodium hydrogencarbonate were dissolved in 100 ml of N,N-dimethylformamide (DMF). This reaction mixture was allowed to react at 80° C for 2 hours. After cooling the reaction mixture, the inorganic component was removed by filtration, and then the DMF was removed from the reaction mixture. The resulting residue was extracted with 200 ml of toluene. The extract liquid was washed well with warm water, dried with magnesium sulfate, and then the toluene was removed therefrom. The residue was then recrystallized from a mixed solvent of toluene and ethyl acetate, whereby 1,1,5,5-tetra-(p-dimethylaminophenyl)-1,4-pentadiene-3-p-napthalenesulfonamide (Leuco Dye No. 56) according to the present invention was obtained in the form of nearly white crystals. The yield was 2.7 g. the melting point was 143 to 143.5° C. The characteristic absroption bands in the visible light absorption spectrum and the infrared spectrum of the thus obtained product were respectively as follows:

Visible light absorption spectrum
λmax acetic acid): 807 nm, ε: $3.86 \times 10^4$;
630 nm, ε: $1.24 \times 10^4$.
Infrared light absorption spectrum (by KBr tablet):
3280 $cm^{-1}$ νNH, 2800 $cm^{-1}$, benzene core,
1605 $cm^{-1}$ νC=C, 1520 $cm^{-1}$, benzene core,
1355 $cm^{-1}$ νas $SO_2$, 1165 $cm^{-1}$ νs $SO_2$.

EXAMPLE 1-16

Synthesis of 1,1,5,5-tetra-p-dimethylaminophenyl)-1,4-pentadiene-3-8-naphthalenesulfonamide (Leuco Dye No. 57)

2.8 g of 1,1,5,5-tetra-p-dimethylaminophenyl)-3-hydroxy-1,4-pentadiene prepared in Synthesis Example 3, 5.18 g of β-naphthalene sulfonamide and 2.1 g of sodium hydrogencarbonate were dissolved in 100 ml of N,N-dimethylformamide DMF). This reaction mixture was allowed to react at 80° C. for 2 hours. After cooling the reaction mixture, the inorganic component was removed by filtration, and then the DMF was removed from the reaction mixture. The resulting residue was extracted with 200 ml of toluene. The extract liquid was washed well with warm water, dried with magnesium sulfate, and then the toluene was removed therefrom. The residue was then recrystallized from a mixed solvent of toluene and ethyl acetate, whereby 1,1,5,5-tetra-(p-dimethylaminophenyl)-1,4-pentadiene-3-8-napthalenesulfonamide (Leuco Dye No. 57) according to the present invention was obtained in the form of nearly white crystals. The yield was 2.51 g. The melting point was 168.5 to 169° C. The characteristic absorption bands in the visible light absorption spectrum and the infrared spectrum of the thus obtained product were respectively as follows:

Visible light absorption spectrum:
λmax (acetic acid): 807 nm, ε: $5.75\times10^4$;
630 nm. ε: $1.85\times10^4$.
Infrared light absorption spectrum (by KBr tablet)
2960 $cm^{-1}$ νas $CH_3$, 2800 $cm^{-1}$ *νCH,*
1610 $cm^{-1}$ νC=C, 1520 $cm^{-1}$, benzene core,
1345 $cm^{-1}$ νas $SO_2$, 1155 $cm^{-1}$ νs $SO_2$.

EXAMPLE 1-17

Synthesis of 1,1,5,5-tetra-(p-dimethylaminophenyl)-1,4-pentadiene-3-p-toluenesulfonamide (Leuco Dye No. 48)

0.9 g of a 60% sodium hydride was dispersed in 100 ml of sufficiently dried DMF. To this dispersion, 3.85 g of p-toluene sulfonamide was gradually added, and the mixture was then stirred for 1 hour. To this mixture, 11.3 g of 1,1,5,5-tetra-(p-diethylaminophenyl)-2,4-pentadiene-1-ol perchlorate was gradually added, and the reaction mixture was allowed to react with stirring at room temperature for 1 hour.

The reaction mixture was then poured into 500 ml of ice water. A precipitate separated out in the reaction mixture. The precipitate was filtered off, washed well with water, and dried under reduced pressure. The thus obtained precipitate was then washed with toluene and recrystallized from ethyl acetate, whereby 1,1,5,5-tetra-(p-dimethylaminophenyl)-1,4-pentadiene-3-p-toluenesulfonamide (Leuco Dye No. 48) according to the present invention was obtained in the form of light green crystals. The yield was 6.52 g. The melting point was 93 to 94° C. The characteristic absorption bands in the visible light absorption spectrum and the infrared spectrum of the thus obtained product were respectively as follows:

Visible light absorption spectrum
λmax (acetic acid): 815 nm, ε: $1.76\times10^4$;
660 nm, ε: $6.85 \times 10^3$.
Infrared light absorption spectrum (by KBr tablet):
3330 $cm^{-1}$ νNH, 3040 $cm^{-1}$ νCH, 2960 νas CH.
1605 $cm^{-1}$ νC=C, 1520 $cm^{-1}$, benzene core, 1360 $cm^{-1}$ νas $SO_2$, 1160 $cm^{-1}$ νs $SO_2$.

EXAMPLE 1-18

Synthesis of 1,1,5,5-tetra-(p-dimethylaminophenyl)-1,4-pentadiene-3-p-aminobenzenesulfonamide Leuco Dye No. 53)

1.5 g of a 60% sodium hydride was dispersed in 100 ml of sufficiently dried DMF. To this dispersion, 8.61 g of p-minobenzenesulfonamide was gradually added, and the mixture was then stirred at 40° C. for 1 hour. The reaction mixture was then cooled to room temperature. To this reaction mixture, 16.1 g of 1,1,5,5-tetra-(p-dimethylaminophenyl)-2,4-pentadiene-1-ol perchlorate prepared in Synthesis Example 2 was gradually added, and the reaction mixture was allowed to react with stirring at room temperature for 1 hour. The reaction mixture was then poured into 600 ml of ice water. A precipitate separated out in the reaction mixture. The precipitate was filtered off, washed well with water, and dried under reduced pressure. The thus obtained precipitate was then recrystallized from acetone, whereby 1,1,5,5-tetra-(p-dimethylaminophenyl)-1,4-pentadiene-3-p-aminobenzenesulfonamide Leuco Dye No. 53) according to the invention was obtained in the form of yellow green crystals. The yield was 11.2 g. The melting point was 147.5 to 153° C. The characteristic absorption bands in the visible light absorption spectrum and the infrared spectrum of the thus obtained product were respectively as follows:

Visible light absorption spectrum:

λmax (acetic acid): 809 nm, ε: $1.57\times10^5$;

629 nm, ε: $5.07\times10^4$.

Infrared light absorption spectrum (by KBr tablet):

3400 $cm^{-1}$, 3250 $cm^{-1}$ νNH, 2800 $cm^{-1}$ νas CH,

1610 $cm^{-1}$ νC=C., 1520 $cm^{-1}$, benzene core,

1360 $cm^{-1}$ νas $SO_2$, 1155 $cm^{-1}$ νs $SO_2$.

EXAMPLE 1-19

Synthesis of 1,1,5,5-tetra-(p-dimethylaminophenyl)-1,4-pentadiene-3-p-nitrobenzenesulfonamide (Leuco Dye No. 55)

1.12 g of a 60% sodium hydride was dispersed in 300 ml of sufficiently dried DMF. To this dispersion, 6.4 g of p-nitrobenzenesulfonamide was gradually added, and the mixture was then stirred for 1 hour. To this reaction mixture, 12 g of 1,1,5,5-tetra-(p-dimethylaminophenyl)-2,4-pentadiene-1-ol perchlorate prepared in Synthesis Example 2 was gradually added, and the reaction mixture was allowed to react with stirring at room temperature for 30 minutes. The reaction mixture was then poured into 1000 ml of ice water. A precipitate separated out in the reaction mixture. The precipitate was filtered off, washed well with water, and dried under reduced pressure. The thus obtained precipitate was then recrystallized from acetone, whereby 1,1,5,5-tetra-(p-dimethylaminophenyl)-1,4-pentadiene-3-p-nitrobenzenesulfonamide (Leuco Dye No. 55) according to the present invention was obtained in the form of light brown crystals. The yield was 10.8 g. The melting point was 144.5 to 148° C. The characteristic absorption bands in the visible light absorption spectrum and the infrared spectrum of the thus obtained product were respectively as follows:

Visible light absorption spectrum:

λmax (acetic acid): 808 nm, ε: $6.93\times10^4$;

632 nm, ε: $2.19\times10^4$.

Infrared light absorption spectrum (by KBr tablet):

3330 $cm^{-1}$ νNH, 3040 $cm^{-1}$ νCH, 2800 $cm^{-1}$ νas CH,

1610 $cm^{-1}$ νC=C, 1520 $cm^{-1}$, benzene core,

1510 $m^{-1}$ νas $NO_2$, 1345 $cm^{-1}$ νs $NO_2$

1360 $cm^{-1}$ νas $SO_2$, 1155 $cm^{-1}$ νs $SO_2$.

EXAMPLE 1-20

Synthesis of 1,1,5,5-tetra-(p-dimethylaminophenyl)-1,4-pentadiene-3-benzamide (Leuco Dye No. 61)

3 g of a 60% sodium hydride was dispersed in 400 ml of sufficiently dried DMF. To this dispersion, 9.09 g of benzamide was gradually added, and the mixture was then stirred at 40° C. for 1 hour. The reaction mixture was cooled to room temperature. To this reaction mixture, 32.16 g of 1,1,5,5-tetra-(p-dimethylaminophenyl)-2,4-pentadiene-1-ol perchlorate prepared in Synthesis Example 2 was gradually added, and the reaction mixture was allowed to react with stirring at room temperature for 1 hour. The reaction mixture was then poured into 1000 ml of ice water. A precipitate separated out in the reaction mixture. The precipitate was filtered off, washed well with water, and dried under reduced pressure. The thus obtained precipitate was then recrystallized from acetone, whereby 1,1,5,5-tetra(p-dimethylaminophenyl)-1,4-pentadiene-3-benzamide (Leuco Dye No. 61) according to the present invention was obtained in the form of light yellow green crystals. The yield was 24.8 g. The melting point was 190 to 190.5° C. The characteristic absorption bands in the visible light absorption spectrum and the infrared spectrum of the thus obtained product were respectively as follows:

Visible light absorption spectrum:

εmax (acetic acid): 806 nm, ε: $1.6\times10^4$;

613 nm, ε: $5.0\times10^4$;

501 nm, s: $3.8\times10^4$.

Infrared light absorption spectrum (by KBr tablet)

1665 $cm^{-1}$ νC=C, 1605 $cm^{-1}$ νC=C,

1520 $cm^{-1}$ benzene core.

EXAMPLE 1-21

Synthesis of 1,1,5,5-tetra-(p-dimethylaminophenyl)-1,4-pentadiene-3-p-methylbenzamide (Leuco Dye No. 63)

3 g of a 60% sodium hydride was dispersed in 400 ml of sufficiently dried DMF. To this dispersion, 10.13 g of p-methylbenzamide was gradually added, and the mixture was then stirred at 40° C. for 1 hour. The reaction mixture was cooled to room temperature. To this reaction mixture, 32.16 g of 1,1,5,5-tetra-(p-dimethylaminophenyl)-2,4-pentadiene-1-ol perchlorate prepared in Synthesis Example 2 was gradually added, and the reaction mixture was allowed to react with stirring at room temperature for 1 hour. The reaction mixture was then poured into 1000 ml of ice water. A precipitate separated out in the reaction mixture. The precipitate was filtered off, washed well with water, and dried under reduced pressure. The thus obtained precipitate was then recrystallized from acetone, whereby 1,1,5,5-tetra-(p-dimethylaminophenyl)-1,4-pentadiene-3-p-methylbenzamide (Leuco Dye No. 63) according to the present invention was obtained in the form of nearly white crystals. The yield was 21.4 g. The melting point was 139.5 to 140.5° C. The characteristic absorption bands in the visible light absorption spectrum and the infrared spectrum of the thus obtained product were respectively as follows:

Visible light absorption spectrum:
λmax (acetic acid): 806 nm, ε: $2.0\times10^4$;
612 nm, ε: $5.1\times10^4$;
504 nm, ε: $4.2\times10^4$.
Infrared light absorption spectrum (by KBr tablet):
3440 $cm^{-1}$ νNH, 2880 $cm^{-1}$ νCH,
1660 $cm^{-1}$ ν C=C, 1605 $cm^{-1}$ νC=C,
1520 $cm^{-1}$ benzene core.

EXAMPLE 1-22

Synthesis of 1,1,5,5-tetra-(p-diethylaminophenyl)-1,4-pentadiene-3-p-methylbenzamide (Leuco Dye No. 64)

3 g of a 60% sodium hydride was dispersed in 400 ml of sufficiently dried DMF. To this dispersion, 10.13 g of p-methylbenzamide was gradually added, and the mixture was then stirred ar 40° C. for 1 hour. The reaction mixture was cooled to room temperature. To this reaction mixture, 37.77 g of 1,1,5,5-tetra-(p-diethylaminophenyl)-2,4-pentadiene-1-ol perchlorate prepared in Synthesis Example 5 was gradually added, and the reaction mixture was allowed to react with stirring at room temperature for 1 hour. The reaction mixture was then poured into 1000 ml of ice water. A precipitate separated out in the reaction mixture. The precipitate was filtered off, washed well with water, and dried under reduced pressure The thus obtained precipitate was then recrystallized from acetone, whereby 1,1,5,5-tetra(p-diethylaminophenyl)-1,4-pentadiene-3-p-methylbenzamide (Leuco Dye No. 64) according to the present invention was obtained in the form of light yellow green crystals. The yield was 19.0 g. The melting point was 186.1 to 187.0° C. The characteristic absorption bands in the visible light absorption spectrum and the infrared spectrum of the thus obtained product were respectively as follows:

Visible light absorption spectrum:
λmax (acetic acid): 813 nm, ε: $3.1\times10^3$;
623 nm, ε: $7.0\times10^3$;
504 nm, ε: $4.3\times10^3$.
Infrared light absorption spectrum (by KBr tablet):
3360 $cm^{-1}$ νNH, 2980 $cm^{-1}$ νCH,
2890 $cm^{-1}$ νs CH, 1660 $cm^{-1}$ νC=C,
1610 $cm^{-1}$ νC=C,
1520 $cm^{-1}$ benzene core .

EXAMPLE 1-23

Synthesis of 1,1,5,5-tetra-(p-diethylaminophenyl)-1,4-pentadiene-3-p-nitrobenzamide (Leuco Dye No. 71)

3 g of a 60% sodium hydride was dispersed in 400 ml of sufficiently dried DMF. To this dispersion, 12.46 g of p-nitrobenzamide was gradually added, and the mixture was then stirred at 40° C. for 1 hour. The reaction mixture was cooled to room temperature. To this reaction mixture, 32.16 g of 1,1,5,5-tetra-(p-dimethylaminophenyl)-2,4-pentadiene-1-ol perchlorate prepared in Synthesis Example 2 was gradually added, and the reaction mixture was allowed to react with stirring at room temperature for 1 hour. The reaction mixture was then poured into 1000 ml of ice water. A precipitate separated out in the reaction mixture. The precipitate was filtered off, washed well with water, and dried under reduced pressure. The thus obtained precipitate was then recrystallized from acetone, whereby 1,1,5,5-tetra-(p-diethylaminophenyl)-1,4-pentadiene-3-p-nitrobenzamide Leuco Dye No. 71) according to the present invention was obtained in the form of light orange crystals. The yield was 20.2 g. The melting point was 151.5 to 156.0° C. The characteristic absorption bands in the visible light absorption spectrum and the infrared spectrum of the thus obtained product were respectively as follows:

Visible light absorption spectrum:
λmax (acetic acid): 807 nm, ε: $2.3\times10^4$;
618 nm, ε: $4.4\times10^4$;
501 nm, ε: $2.8\times10^4$.
Infrared light absorption spectrum (by KBr tablet):
3420 $cm^{-1}$ νNH, 2800 $cm^{-1}$ νCH,
1670 $cm^{-1}$ νC=0, 1606 $cm^{-1}$ νC=C,
1520 $c^{-1}$ benzene core, 1345 $cm^{-1}$ νs $NO_2$
870 $cm^{-1}$ νCN.

EXAMPLE 1-24

Synthesis of 1,1,5,5-tetra-p-diethylaminophenyl)-1,4-pentadiene-3-8-napthobenzamide (Leuco Dye No. 77)

3 g of a 60% sodium hydride was dispersed in 400 ml of sufficient dried DMF. To this dispersion, 12.84 g of 8-napthamide was gradually added, and the mixture was then stirred at 40° C for 1 hour. The reaction mixture was cooled to room temperature. To this reaction mixture, 32.16 g of 1,1,5,5-tetra-(p-dimethylaminophenyl)-2,4-pentadiene-1-ol perchlorate prepared in Synthesis Example 2 was gradually added, and the reaction mixture was allowed to react with stirring at room temperature for 1 hour. The reaction mixture was then poured into 1000 ml of ice water. A precipitate separated out in the reaction mixture. The precipitate was filtered off, washed well with water, and dried under reduced pressure. The thus obtained precipitate was then recrystallized from acetone, whereby 1,1,5,5-tetra(p-diethylaminophenyl)-1,4-pentadiene-3-8-naphthobenzamide (Leuco Dye No. 77) according to the present invention was obtained in the form of light yellow green crystals. The yield was 25.5 g. The melting point was 124 to 126° C. The characteristic absorption bands in the visible light absorption spectrum and the infrared spectrum of the thus obtained product were respectively as follows:

Visible light absorption spectrum:
λmax (acetic acid): 805 nm, ε: $2.9\times10^4$;
612 nm, ε: $5.2\times10^4$;
504 nm, ε: $4.3\times10^4$.
Infrared light absorption spectrum (by KBr tablet):
3410 $cm^{-1}$ νNH, 2790 $cm^{-1}$ νCH,
1655 $cm^{-1}$ νC=0, 1600 $cm^{-1}$ νC=C,
1520 $cm^{-1}$ benzene core, 1295 $cm^{-1}$ νCN.

EXAMPLE 1-25

Synthesis of 1,1,5,5-tetra-(p-diethylaminophenyl)-1,4-pentadiene-3-valeramide (Leuco Dye No. 60)

3 g of a 60% sodium hydride was dispersed in 400 ml of sufficiently dried DMF. To this dispersion, 7.7 g of valeramide was gradually added, and the mixture was then stirred at 40° C for 1 hour. The reaction mixture was cooled to room temperature. To this reaction mixture, 32.16 g of 1,1,5,5-tetra-(p-dimethylaminophenyl)-2,4-pentadiene-1-ol perchlorate prepared in Synthesis Example 2 was gradually added, and the reaction mixture was allowed to react with stirring at room temperature for 1 hour. The reaction mixture was then poured into 1000 ml of ice water. A precipitate separated out in the reaction mixture. The precipitate was filtered off, washed well with water, and dried under reduced pressure. The thus obtained precipitate was then recrystallized from acetone, whereby 1,1,5,5-tetra-(p-diethylaminophenyl)-1,4-pentadiene-3-valeramide (Leuco Dye No. 60) according to the present invention was obtained in the form of light yellow green crystals. The yield was 26.6 g. The melting point was 110.5 to 115° C. The characteristic absorption bands in the visible light absorption spectrum and the infrared spectrum of the thus obtained product were respectively as follows:

Visible light absorption spectrum:
λmax (acetic acid): 804 nm, ε: $1.4 \times 10^4$;
609 nm, ε: $3.0 \times 10^4$;
492 nm, ε: $1.9 \times 10^4$.
Infrared light absorption spectrum (by KBr tablet):
3410 $cm^{-1}$ νNH, 2800 $cm^{-1}$ νCH,
1655 $cm^{-1}$ νC=O, 1610 $cm^{-1}$ νC=C,
1520 $cm^{-1}$ benzene core.

EXAMPLE 1-26

Synthesis of 1,1,5,5-tetra-(p-diethylaminophenyl)-1,4-pentadiene-3-p-trifluoromethylbenzamide (Leuco Dye No. 67)

3 g of a 60% sodium hydride was dispersed in 400 ml of sufficiently dried DMF. To this dispersion, 13.0 g to p-trifluorobenzamide was gradually added, and the mixture was then stirred at 40° C for 1 hour. The reaction mixture was cooled to room temperature. To this reaction mixture, 32.16 g of 1,1,5,5-tetra-(p-dimethylaminophenyl)-2,4-pentadiene-1-ol perchlorate prepared in Synthesis Example 2 was gradually added, and the reaction mixture was allowed to react with stirring at room temperature for 1 hour. The reaction mixture was then poured into 1000 ml of ice water. A precipitate separated out in the reaction mixture. The precipitate was then recrystallized from acetone, whereby 1,1,5,5-tetra-(p-diethylaminophenyl)-1,4-pentadiene-3-p-trifluoromethylbenzamide (Leuco Dye No. 67) according tetra-(p-diethylaminophenyl)-1,4-pentadiene-3-p-trifluoromethylbenzamide (Leuco Dye No. 67) according to the present invention was obtained in the form of light yellow green crystals. The yield was 27.8 g. The melting point was 125.5 to 131.5° C. The characteristic absorption bands in the visible light absorption spectrum and the infrared spectrum of the thus obtained product were respectively as follows:

Visible light absorption spectrum:
λmax (acetic acid): 804 nm, ε: $7.1 \times 10^3$;
614 nm, $4.3 \times 10^4$;
496 nm, $3.1 \times 10^4$.
Infrared light absorption spectrum (by KBr tablet):
3470 $cm^{-1}$ νNH, 2810 $cm^{-1}$ νCH,
1680 $cm^{-1}$ νC=O, 1610 $cm^{-1}$ νC=C,
1520 $cm^{-1}$ benzene core, 1325 $cm^{-1}$ νs C—F,
1170 $cm^{-1}$ 1130 $cm^{-1}$ νas C—F.

EXAMPLES 1-27 to 1-35

In the same manner as in Example 1-1, the leuco dyes as listed in the following Table 1 were synthesized and brought into contact with silica gel to induce color formation in each leuco dye. As a result, the colors as shown in table 1 were induced.

TABLE 1

| Examples | Leuco Dyes | Induced Color in Contact with Silica Gel |
|---|---|---|
| Ex. 1-27 | No. 2 | Dark Blue |
| Ex. 1-29 | No. 8 | Dark Blue |
| Ex. 1-30 | No. 26 | Dark Blue |
| Ex. 1-31 | No. 15 | Dark Blue |
| Ex. 1-32 | No. 24 | Dark Green |
| Ex. 1-33 | No. 35 | Dark Blue |
| Ex. 1-34 | No. 31 | Dark Blue |
| Ex. 1-35 | No. 32 | Dark Blue |

EXAMPLE 2-1

Preparation of Thermosensitive Recording Material No. 1

Liquid A-1, Liquid B-1, Liquid C-1 and Liquid D-1 were separately prepared by dispersing the following respective components in a ball mill;

| [Liquid A-1] | Parts by Weight |
|---|---|
| Leuco Dye No. 1 prepared in Example 1-1 | 10 |
| 10% aqueous solution of hydroxyethylcellulose | 10 |
| Water | 55 |

The volume means diameter of the above dispersed leuco dye was 2.58 μm.

| [Liquid B-1] | Parts by Weight |
|---|---|
| Stearamide | 20 |
| 5% aqueous solution of methylcellulose | 10 |
| Surfactant (Trademark "Epan 420" made by Dai-ichi Kogyo Seiyaku Co., Ltd.) | 2 |
| Water | 60 |

| [Liquid C-1] | Parts by Weight |
|---|---|
| Calcium carbonate | 30 |
| 5% aqueous solution of methylcellulose | 30 |
| Surfactant Trademark "Epan 420" made by Dai-ichi Kogyo Seiyaku Co., Ltd.) | 2 |
| Water | 60 |

| [Liquid D-1] | Parts by Weight |
|---|---|
| Bisphenol A | 40 |
| 10% aqueous solution of polyvinyl alcohol | 20 |
| Water | 140 |

Liquid A, Liquid B, Liquid C and Liquid D were mixed with a mixing ratio by weight 1 : 1 : 1 : 3, so that a thermosensitive coloring layer coating liquid was prepared. The thus prepared thermosensitive coloring layer coating liquid was coated on a sheet of high quality paper having a basis weight of 50 $g/m^2$, with a depo sition of 0.45 g/$m^2$ on a dry basis, and then dried, whereby a thermosensitive recording material No. 1 according to the present invention was prepared.

The thus prepared thermosensitive recording material No. 1 was subjected to a printing test by use of a commercially available heat gradient test apparatus with application of heat at 130° C for 1 second and a pressure of 2.0 kg/$cm^2$ to induce color formation in the recording material.

The density of the induced colored images in the recording material and the background density thereof were measured by a McBeth densitometer equipped with a commercially available filter for black color (Kodak Latten No. 25). The result was that the density of the induced color was 1.03 and the background density was 0.10. The induced color had a color tone of dark blue and the color induced area had a spectrum absorption in the range of about 500 to 900 nm.

EXAMPLE 2–2

Preparation of Thermosensitive Recording Material No. 2

The procedure of Example 2-1 was repeated except that Leuco Dye No. 1 employed in Liquid A in Example 2-1 was replaced by Leuco Dye No. 25 prepared in Example 1-6, with a volume mean diameter of 2.54 μm. whereby a thermosensitive recording material No. 2 according to the present invention was prepared.

The thus prepared thermosensitive recording material was subjected to the same printing test as in Example 2-1, so that the induced color, the image density and the background density were measured. The result was that the density of the induced color was 1.01 and the background density was 0.10. The induced color had a tone of dark blue and the color inducted area had a spectrum absorption in the range of about 500 to 900 nm.

EXAMPLE 2–3

Preparation of Thermosensitive Recording Material No. 3

The procedure of Example 2-1 was repeated except that Leuco Dye No. 1 employed in Liquid A in Example 2-1 was replaced by Leuco Dye No. 21 prepared in Example 1-5, whereby a thermosensitve recording material No. 3 according to the present invention was prepared.

The thus prepared thermosensitive recording material was subjected to the same printing test as in (Example 2-1, so that the induced color, the image density and the background density were measured. The result was that the density of the induced color was 1.01 and the background density was 0.10. The induced color had a tone of dark blue and the color inducted area had a spectrum absorption in the range of about 500 to 900 nm.

EXAMPLE 2–4

Preparation of Thermosensitive Recording Material No. 4

The procedure of Example 2-1 was repeated except that Leuco Dye No. 1 employed in Liquid A in Example 2-1 was replaced by Leuco Dye No. 29 prepared in Example 1-8, with a volume mean diameter of 2.23 μm, whereby a thermosensitive recording material No. 4 according to the present invention was prepared.

The thus prepared thermosensitive recording material was subjected to the same printing test as in Example 2-1, so that the induced color, the image density and the background density were measured The result was that the density of the induced color was 1.02 and the background density was 0.10. The induced color had a tone of dark blue and the color inducted area had a spectrum absorption in the range of about 500 to 900 nm.

EXAMPLE 2–5

Preparation of Thermosensitive Recording Material No. 5

The procedure of Example 2-1 was repeated except that Leuco Dye No. 1 employed in Liquid A in Example 2-1 was replaced by Leuco Dye No. 45 prepared in Example 1-12, with a volume mean diameter of 3.14 μm, whereby a thermosensitive recording material No. 5 according to the present invention was prepared.

The thus prepared thermosensitive recording material was subjected to the same printing test as in Example 2–1, so that the induced color, the image density and the background density were measured. The result was that the density of the induced color was 1.46 and the background was white with a background density of 0.10. The induced color had a tone of dark blue and the color inducted area had a spectrum absorption in the range of about 500 to 900 nm.

The thus prepared thermosensitive recording material with a developed colored image was subjected to a preservability test by storing the same at 60° C in a dry state for 16 hours (heat resistance test), by storing the same at 40° C and a humidity of 90% for 16 hours (humidity resistance test), and by storing the same under an illuminance of 5000 lux for 16 hours (light resistance test), so that the heat resistance, humidity resistance and light resistance of the recording material were assessed from the formula.

$$\frac{\text{Colored image density after test}}{\text{Colored image density before test}} \times 100\%.$$

The result was that the heat resistance was 98.8%, the humidity resistance was 98.0%, and the light resistance was 99.2%, without any fogging in the background after the preservability test, which indicate that the thermosensitive recording material No. 5 according to the present invention is excellent in the above three properties.

EXAMPLE 2–6

Preparation of Thermosensitive Recording Material No. 6

The procedure of Example 2-5 was repeated except that Leuco Dye No. 45 employed in Liquid A in Example 2-5 was replaced by Leuco Dye No. 56 prepared in Example 1-15, with a volume mean diameter of 2.2 μm, wherey a thermosensitive recording material No. 6 according to the present invention was prepared.

The thus prepared thermosensitive recording material was subjected to the same printing test as in Example 2-1, so that the induced color, the image density and the background density were measured. The result was that the density of the induced color was 1.32 and the background was white with a background density of 0.12. The induced color had a tone of deep blue and the color inducted area had a spectrum absorption in the range of about 500 to 900 nm.

The thus prepared thermosensitive recording material with a developed colored image was subjected to the same preservability test as in Example 2-5. The result was that the heat resistance was 98.8%, and the humidity resistance was 98.0%, and the light resistance was 99.2%, without any fogging in the background after the preservability test, which indicates that the thermosensitive according material No. 6 accoridng to the present invention is excellent in the above three properties.

EXAMPLE 2-7

Preparation of Thermosensitive Recording Material No. 7

The procedure of Example 2-1 was repeated except that Leuco Dye No. 1 employed in Liquid A in Example 2-1 was replaced by Leuco Dye No. 61 prepared in Example 1-20, with a volume mean diameter of 2.18 μm, whereby a thermosensitive recording material No. 5 according to the present invention was prepared.

The thus prepared thermosensitive recording material was subjected to the same printing test as in Example 2-1, so that the induced color, the image density and the background density were measured. The result was that the density of the induced color was 1.01 and the background was white with a background density of 0.10. The induced color had a tone of deep blue and the color inducted area had a spectrum absorption in the range of about 500 to 900 nm.

The thus prepared thermosensitive recording material with a developed colored image was subjected to the same preservability test as in Example 2-5. The result was that the heat resistance was 100%, the humidity resistance was 100%, and the light resistance was 99.2%, without fogging in the background after the preservability test, which indicates that the thermosensitive recording material No. 7 according to the present invention is excellent in the above three properties.

COMPARATIVE EXAMPLE 1

The procedure of Example 2-1 was repeated except the Leuco Dye No. 1 employed in example 2-1 was replaced by 3-anilino-4-methyl-7-(N-cyclohexyl-N-methyl)aminofluoran which is commercially available with a trademark of "PSD-150" from Nippon Soda Co., Ltd., whereby comparative thermosensitive recording material No. 1 was prepared.

The thus prepared comparative thermosensitive recording material No. 1 was subjected to the same printing test as in Example 2-1. The result was that black images were obtained. However, the developed images had no spectrum adsorption in the range beyond about 700 nm.

EXAMPLE 2-8

Preparation of Thermosensitive Recording Material No. 8

Liquid A-8, Liqud B-8 and Liquid C-8 were separately prepared by dispersing the following respective components in a ball mill;

[Liquid A-8]

| | Parts by Weight |
|---|---|
| Leuco Dye No. 29 prepared in Example 1-8 | 10 |
| 10% aqueous solution of hydroxyethylcellulose | 10 |
| Water | 55 |

The volume means diameter of the above dispersed leuco dye was 2.16 μm.

[Liquid B-8]

| | Parts by Weight |
|---|---|
| Stearamide | 20 |
| 5% aqueous solution of methylcellulose | 10 |
| Surfactant (Trademark "Epan 420" made by Dai-ichi Kogyo Seiyaku Co., Ltd.) | 2 |
| Water | 60 |

The above Liquid B-8 is the same as that employed in Example 2-1.

[Liquid C-8]

| | Parts by Weight |
|---|---|
| Stearyl gallate | 40 |
| 10% aqueous solution of polyvinyl alcohol | 20 |
| Water | 140 |

Liquid A-8, Liquid B-8, and Liquid C-8 were mixed with a mixing ratio by weight of 1 : 4 : 3, so that a thermo-sensitive coloring layer coating liquid was prepared. The thus prepared thermosensitive coloring layer coating liquid was coated on a sheet of high quality paper having a basis weight of 50 $g/m^2$, with a deposition of 0.45 $g/m^2$ on a dry basis, and then dried, whereby a thermosensitive recording material No. 8 according to the present invention was prepared.

.The thus prepared thermosensitive recording material was subjected to the same printing test as in Example 2-1, so that the induced color, the image density and the background density were measured. The result was that the density of the induced color was 0.95 and the background was white with a background density of 0.08. The induced color had a tone of blue and the color inducted area had a spectrum absorption in the range of about 500 to 900 nm.

The thus prepared thermosensitive recording material with a developed colored image was subjected to the same preservability test as in example 2-5. The result was that the heat resistance was 100%, the humidity resistnace was 100%, and the light resistance was 100%, without fogging in the background after the preservability test, which indicates that the thermosensitive recording material No. 8 according to the present invention is excellent in the above three properties.

EXAMPLE 2-0

Preparation of Thermosensitive Recording Material No. 9

The procedure of Example 2-8 was repeated except the Leuco Dye No. 29 in Liquid A-8 employed in example 2-8 was replaced by Leuco Dye No. 61 prepared in EAxample 1-20 and the volume mean diameter of the above dispersed leuco dye was changed to 3.14 μm, whereby a thermosensitive recording material No. 9 according to the present invention was prepared.

The thus prepared thermosensitive recording material was subjected to the same printing test as in Example 2-1, so that the induced color, the image density and the background density were measured. The result was that the density of the induced color was 1.32 and the background was white with a background density of 0.08. The induced color had a tone of blue and the color inducted area had a spectrum absorption in the range of about 500 to 900 nm.

The thus prepared thermosensitive recording material with a developed colored image was subjected to the same preservability test as in Example 2-5. The result was that the heat resistance was 100%, the humidity resistance was 100%, and the light resistance was 100%, without fogging in the background after the heat resistance test and the light resistance test, but with slight fogging in the background after the humidity resistance test, without causing any practical problems, which still indicates that the thermosensitive recording material No. 9 according to the present invention is excellent in the above three properties.

EXAMPLE 2-10

Preparation of Thermosensitive Recording Material No. 10

The procedure of Example 2-8 was repeated except that Leuco Dye No. 29 in Liquid A-8 employed in Example 2-8 was replaced by Leuco Dye No. 45 prepared in Example 1-12 and the volume mean diameter of the above dispersed leuco dye was changed to 2.34 μm, whereby a thermosensitive recording material No. 10 according to the present invention was prepared.

The thus prepared thermosensitive recording material was subjected to the same printing test as in Example 2-1, so that the induced color, the image density and the background density were measured. The result was that the density of the induced color was 1.19 and the background was white with a background density of 0.08. The induced color had a tone of dark blue and the color inducted area had a spectrum absorption in the range of about 500 to 900 nm.

The thus prepared thermosensitive recording material with a developed colored image was subjected to the same preservability test as in Example 2-5. The result was that the heat resistance was 96%, the humidity resistance was 100%, and the light resistance was 100%, without fogging in the background after the heat resistance test and the light resistance test, but with slight fogging in the background after the humidity resistance test, without causing practical problems, which still indicates that the thermosensitive recording material No. 9 according to the present invention is excellent in the above three properties.

COMPARATIVE EXAMPLE 2

Comparative Thermosensitive Recording Material No. 2

The procedure of Example 2-8 was repeated except that Liquid A-8 employed in Example 2-8 was replaced by the following Comparative Liquid A-1, whereby a comparative thermosensitive recording material No. 2 was prepared.

[Comparative Liquid A-1]

| | Parts by Weight |
|---|---|
| Bis(p-dimethylaminostyryl)-p-toluenesulfomethane | 10 |
| 10% aqueous solution of hydroxymethylcellulose | 10 |
| Water | 55 |

The thus prepared comparative thermosensitive recording material No. 2 was subjected to the same printing test as in Example 2-1 to induce color formation in the recording material.

The thus prepared thermosensitive recording material was subjected to the same printing test as in Example 2-1, so that the induced color, the image density and the background density were measured. The result was that the density of the induced color was 0.75 and the background was yellow with a background density of 0.08. The induced color had a tone of bluish green.

The thus prepared thermosensitive recording material with a developed colored image was subjected to the same preservability test as in Example 2-5. The result was that the heat resistance was 100%, the humidity resistance was 100%, and the light resistance was 97%, without fogging in the background after the preservability test.

COMPARATIVE EXAMPLE 3

Comparative Thermosensitive Recording Material No. 3]

The procedure of Example 2-8 was repeated except that Liquid A-8 employed in Example 2-8 was replaced by the following Comparative Liquid A-2, whereby a comparative thermosensitive recording material No. 3 was prepared.

[Comparative Liquid A-2]

| | Parts by Weight |
|---|---|
| 1,1,5,5-tetra-(p-dimethylaminophenyl)-3-p-toluenesulfinyl-1,4-pentadiene | 10 |
| 10% aqueous solution of hydroxymethylcellulose | 10 |
| Water | 55 |

The thus prepared comparative thermosensitive recording material No. 3 was subjected to the same printing test as in Example 2-1 to induce color formation in the: recording material.

The thus prepared thermosensitive recording material was subjected to the same printing test as in Example 2-1, so that the induced color, the image density and the background density were measured. The result was that the density of the induced color was 1.18 and the background was light blue with a background density of 0.08. The induced color had a tone of dark blue.

The thus prepared thermosensitive recording material with a developed colored image was subjected to the same preservability test as in Example 2-5. The result was that the heat resistance was 100%, the humidity resistance was 100%, and the light resistance was 97%. However, the fogging of the background was considerable after the preservability test.

EXAMPLE 2-11

Preparation of Thermosensitive Recording Material No. 11

The procedure of Example 2-8 was repeated except that in addition to Liquid A-8, Liquid B-8, and Liquid C-8, Liquid D-11 and Liquid E-11 with the following formulations were employed, and Liquid A-8, Liquid B-8, Liquid C-8, Liquid D-11 and Liquid E-11 were mixed with a ratio by weight of 1 : 4 : 3 : 1 : 1, whereby a thermosensitive recording material No. 11 according to the present invention was prepared.

[Liquid D-11]

| | Parts by Weight |
|---|---|
| Leuco Dye ("PSD-150" made by Nippon Soda Co., Ltd.) | 10 |
| 10% aqueous solution of hydroxymethylcellulose | 10 |
| Water | 55 |

[Liquid E-11]

| | Parts by Weight |
|---|---|
| Zinc stearate | 10 |
| 10% aqueous solution of polyvinyl alcohol | 10 |
| Water | 30 |

The thus prepared thermosensitive recording material was subjected to the same printing test as in Example 2-1, so that the induced color, the image density and the background density were measured. The result was that the density of the induced color was 1.46 and the background was white with a background density of 0.08. The induced color was black and the color inducted area had a spectrum absorption in the range of about 500 to 900 nm.

The thus prepared thermosensitive recording material with a developed colored image was subjected to the same preservability test as in Example 2-5. The result was that the heat resistance was 100%, the humidity resistance was 100%, and the light resistance was 100%, without fogging in the background after the light resistance test, but with slight fogging in the background after the heat resistance test and the humidity resistance test, without causing any practical problems, which still indicates that the thermosensitive recording material No. 11 according to the present invention is excellent in the above three properties.

EXAMPLE 2-12

The procedure of Example 2-11 was repeated except that Leuco Dye No. 29 in Liquid A-8 employed in Example 2-11 was replaced by Leuco Dye No. 61 prepared in Example 1-20 and the volume mean diameter of the above dispersed leuco dye was changed to 3.14 μm, whereby a thermosensitive recording material No. 12 according to the present invention was prepared.

The thus prepared thermosensitive recording material was subjected to the same printing test as in Example 2-1, so that the induced color, the image density and the background density were measured. The result was that the density of the induced color was 1.48 and the background was white with a background density of 0.09. The induced color was black and the color inducted area had a spectrum absorption in the range of about 500 to 900 nm.

The thus prepared thermosensitive recording material with a developed colored image was subjected to the same preservability test as in Example 2-5. The result was that the heat resistance was 100%, the humidity resistance was 100%, and the light resistance was 100%, without fogging in the background after the light resistance test, but with slight fogging in the background after the heat resistance test and the humidity resistance test, without causing any practical problems, which still indicates that the thermosensitive recording material No. 12 according to the present invention is excellent in the above three properties.

EXAMPLE 2-13

The procedure of Example 2-11 was repeated except that Leuco Dye No. 29 in Liquid A-8 employed in Example 2-11 was replaced by Leuco Dye No. 45 prepared in Example 1-12 and the volume mean diameter of the above dispersed leuco dye was changed to 2.34 μm, whereby a thermosensitive recording material No. 13 according to the present invention was prepared.

The thus prepared thermosensitive recording material was subjected to the same printing test as in Example 2-1, so that the induced color, the image density and the background density were measured. The result was that the density of the induced color was 1.50 and the background was white with a background density of 0.09. The induced color was black and the color inducted area had a spectrum absorption in the range of about 500 to 900 nm.

The thus prepared thermosensitive recording material with a developed colored image was subjected to the same preservability test as in Example 2-5. The result was that the heat resistance was 99%, the humidity resistance was 100%, and the light resistance was 100%, without fogging in the background after the light resistance test, but with slight fogging in the background after the heat resistance test and the humidity resistance test, without causing any practical problems, which still indicates that the thermosensitive recording material No. 13 according to the present invention is excellent in the above three properties.

EXAMPLE 3-1

Preparation of Pressure-sensitive Recording Material No. 1

10 parts by weight of gelatin and 10 parts by weight of gum arabic were dissolved in 400 parts by weight of water at 40° C. To this solution, 0.2 parts by weight of Turkey red oil serving as an emulsifier and 40 parts by weight of a 2%-diisopropyl naphthalene oil solution of Leuco Dye No. 5 prepared in Example 1-2 were added, dispersed and emulsified. The emulsification was terminated when the average size of the oil drops in this emulsion reached about 5 μm. To this emulsion, water at 40° C was added to make the total amount of the mixture 900 parts by weight, with stirring, and keeping the temperature of the emulsion at not less than 40° C. By adding a 10%-acetic acid solution gradually, the pH of this emulsion was adjusted to 4.0 to 4.2 to cause coacervation. With further stirring for 20 minutes, the emulsion was cooled down to gel the coacervate film deposited on surface of the oil drops. The temperature of the emulsion was decreased to 20° C, and 7 parts by weight of a 37%-formaldehyde solution was added to this emulsion. When the temperature of the mixture was further decreased to 10° C, a 15% sodium hydroxide aqueous solution was gradually and carefully added to the mixture to adjust the pH to 9.0. Then the thus prepared emulsion was heated to 50° C, with stirring for 20 minutes, whereby microcapsules in which the leuco dye was dissolved in the oil were prepared.

The thus prepared microcapsuled leuco compound, with addition of a water-soluble starch serving as a binder, was coated on a sheet of paper with a deposition of 6 g/m$^2$, so that a color former sheet was prepared. The thus prepared color former sheet was attached to a commercially available pressure-sensitive color developer sheet, whereby a pressure-sensitive recording material No. 1 according to the present invention was prepared.

By writing with a pencil on the pressure-sensitive recording material, dark blue images were clearly formed on the color developer sheet.

EXAMPLE 3-2

Preparation of Pressure-sensitive Recording Material No. 2

The procedure of Example 3-1 was repeated except that Leuco Dye No. 5 employed in Example 3-1 was replaced by Leuco Dye No. 13 prepared in Example 1-7, whereby a color former sheet was prepared. The thus prepared color former sheet was attached to a commercially available pressure-sensitive color developer sheet, whereby a pressure-sensitive recording material No. 2 according to the present invention was prepared.

By writing with a pencil on the pressure-sensitive recording material, dark blue images were clearly formed on the color developer sheet.

EXAMPLE 3-3

Preparation of Pressure-sensitive Recording Material No. 3

The procedure of example 3-1 was repeated except that Leuco Dye No. 5 employed in Example 3-1 was replaced by Leuco Dye No. 33 prepared in Example 1-9, whereby a color fomrer sheet was prepared. The thus prepared color former sheet was attached to a commercially available pressure-sensitive color developer sheet, whereby a pressure-sensitive recording material No. 3 according to the present invention was prepared.

By writing with a pencil on the pressure-sensitive recording material, dark blue images were clearly formed on the color developer sheet.

EXAMPLE 3-4

Preparation of Pressure-sensitive Recording Material No. 4

The procedure of Example 3-1 was repeated except that Leuco Dye No. 5 employed in Example 3-1 was replaced by Leuco Dye No. 46 prepared in EAxample 1-13, whereby a color former sheet was prepared. The thus prepared color former sheet was attached to a commercially available pressure-sensitive color developer sheet, whereby a pressure-sensitive recording material No. 4 according to the present invention was prepared.

By writing with a pencil on the pressure-sensitive recording material, deep blue images were clearly formed on the color developer sheet.

EXAMPLE 3-5

Preparation of Pressure-sensitive Recording Material No. 5

The procedure of Example 3-1 was repeated except that Leuco Dye No. 5 employed in Example 3-1 was replaced by Leuco Dye No. 56 prepared in Example 1-16, whereby a color former sheet was prepared. The thus prepared color former sheet was attached to a commercially available pressure-sensitive color developer sheet, whereby a pressure-sensitive recording material No. 5 according to the present invention was prepared.

By writing with a pencil on the pressure-sensitive recording material, deep blue images were clearly formed on the color developer sheet.

EXAMPLE 3-6

Preparation of Pressure-sensitive Recording Material No. 6

The procedure of Example 3-1 was repeated except that Leuco Dye No. 5 employed in Example 3-1 was replaced by Leuco Dye No. 63 prepared in Example 1-21, whereby a color former sheet was prepared The thus prepared color former sheet was attached to a commercially available pressure-sensitive color developer sheet, whereby a pressure-sensitive recording material No. 6 according to the present invention was prepared By writing with a pencil on the pressure-sensitive recording material, deep blue images were clearly formed on the color developer sheet.

What is claimed is:

1. A leuco dye of the formula (I):

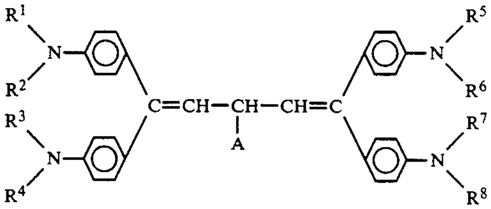

(I)

wherein $R^1$, $R^2$, $R^3$, $R^4$, $R^5$, $R^6$, $R^7$, and $R^8$ each represent a lower alkyl group; A represents

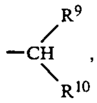

, in which $R^9$ and $R^{10}$ each represent hydrogen, —CN or —CON$^{14}$ in which $R^{14}$ represents a phenyl group which is unsubstituted or is substituted by an alkyl group having 1 to 4 carbon atoms, an alkoxyl group having 1 to 4 carbon atoms, or a halogen, a naphthyl group which is unsubstituted or is substituted by an alkyl group having 1 to 4 carbon atoms, an alkoxyl group having 1 to 4 carbon atoms or a halogen, or a lower alkoxyl group,

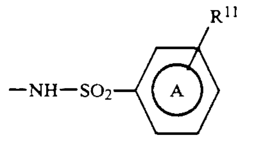

in which

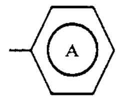

represents a phenyl group or a naphthyl group, $R^{11}$ represents hydrogen, a lower alkyl group, a halogen, an amino group, which is unsubstituted or is substituted by an alkyl group having 1 to 4 carbon atoms, or a nitro group, or

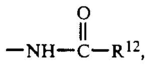

in which $R^{12}$ represents a lower alkyl group or

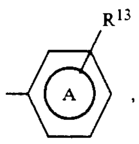

in which $R^{13}$ represents hydrogen, a lower alkyl group, a halogen, a hydroxyl gruop, a trifluoromethyl gruop, a nitro group, an amino group which is unsubstituted or is substituted by an alkyl group having 1 to 4 carbon atoms, or amide group, provided that both $R^9$ and $R^{10}$ may not be hydrogen.

2. The leuco dye as claimed in claim 1, wherein A is

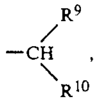

wherein $R^9$ and $R^{10}$ each represent hydrogen, —CN or —$COR^{14}$ in which $R^{14}$ represents a phenyl group which is unsubstituted or is substituted by an alkyl group having 1 to 4 carbon atoms, an alkoxyl group having 1 to 4 carbon atoms, or a halogen, or a naphthyl group which is unsubstituted or is substituted by an alkyl group having 1 to 4 carbon atoms, an alkoxyl group having 1 to 4 carbon atoms, or a halogen, a lower alkyl group, or a lower alkoxyl group, $R^{11}$ represents hydrogen, a lower alkyl group, a halogen, an amino group, which is unsubstituted or is substituted by an alkyl group having 1 to 4 carbon atoms, or a nitro group, provided that both $R^9$ and $R^{10}$ may not be hydrogen.

3. The leuco dye as claimed in claim 2, wherein $R^9$ and $R^{10}$ each represent —$COR^{14}$ in which $R^{14}$ represents a phenyl group which is unsubstituted or is substituted by an alkyl group having 1 to 4 carbon atoms, an alkoxyl group having 1 to 4 carbon atoms or a halogen, or a naphthyl group which is unsubstituted or is substituted by an alkyl group having 1 to 4 carbon atoms, an alkoxyl group having 1 to 4 carbon atoms or a halogen, a lower alkyl group, or a lower alkoxyl group.

4. The leuco dye as claimed in claim 1, wherein $R^1$ to $R^8$ is an alkyl group having 1 to 4 carbon atoms.

5. The leuco dye as claimed in claim 1, wherein $R^{11}$ is an alkyl group having 1 to 4 carbon atoms.

6. The leuco dye as claimed in claim 1, wherein $R^{11}$ is a halogen.

7. The leuco dye as claimed in claim 1, wherein $R^{11}$ is a dialkylamino group with each alkyl group thereof having 1 to 4 carbon atoms.

8. The leuco dye as claimed in claim 1, wherein $R^{11}$ is a nitro group.

9. The leuco dye as claimed in claim 1, wherein $R^{12}$ is an alkyl group having 1 to 4 carbon atoms.

10. The leuco dye as claimed in claim 1, wherein $R^{12}$ is an aryl group selected from the group consisting of an phenyl group and a naphthyl group.

11. The leuco dye as claimed in claim 1, wherein $R^{13}$ is hydrogen.

12. The leuco dye as claimed in claim 1, wherein $R^{13}$ is a lower alkyl group having 1 to 6 carbon atoms.

13. The leuco dye as claimed in claim 1, wherein $R^{13}$ is a halogen.

14. The leuco dye as claimed in claim 1, wherein $R^{13}$ is a group selected from the group consisting of a hydroxyl group, a trifluoromethyl group, a nitro group, an amino group, an amino group having one or two lower alkyl group substituents, and an amide group.

15. A dye-containing composition, comprising:

(a) at least one leuco dye having the formula (I):

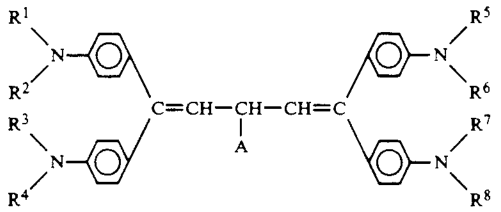
(I)

wherein $R^1$, $R^2$, $R^3$, $R^4$, $R^5$, $R^6$, $R^7$, and $R^8$ and lower alkyl group; A represents

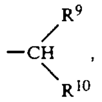

in which $R^9$ and $R^{10}$ each represent hydrogen, —CN or —$COR^{14}$ in which $R^{14}$ represents a phenyl group which is unsubstituted or is substituted by an alkyl group having 1 to 4 carbon atoms, or a halogen, a napthyl group which is unsubstituted or is substituted by an alkyl group having 1 to 4 carbon atoms, an alkoxyl group having 1 to 4 carbon atoms or a halogen, or a lower alkoxyl group,

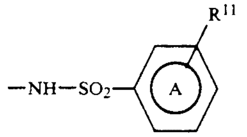

in which

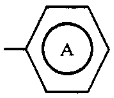

represents a phenyl group or a napthyl group, $R^{11}$ represents hydrogen, a lower alkyl group, a halogen, an amino group, which is unsubstituted or is substituted by an alkyl group having 1 to 4 carbon atoms, or a nitro group, or

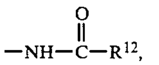

in which $R^{12}$ represents a lower alkyl group, or

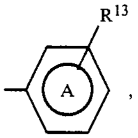

in which $R^{13}$ represents hydrogen, a lower alkyl group, a halogen, a hydroxyl group, a trifluoromethyl group, a nitro group, an amino group which is unsubstituted or is substituted by an alkyl group having 1 to 4 carbon atoms, or amide group, provided that both $R^9$ and $R^{10}$ may not be hydrogen; and (b) at least one other leuco dye capable of correcting the color tone or the light absorbing properties of the leuco dye of formula (I).

16. The dye-containing composition as claimed in claim 15, wherein said other leuco dye is 3-anilino-4-methyl-7-(n-cyclohexyl-N-methyl)aminofluoran.

17. A dye-containing composition, comprising:

(a) at least one leuco dye having the formula (I):

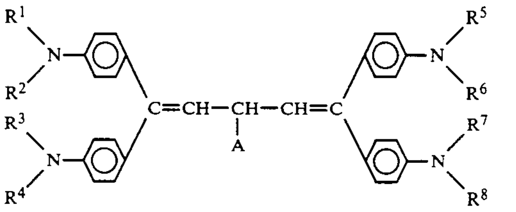

(I)

wherein $R^1$, $R^2$, $R^3$, $R^4$, $R^5$, $R^6$, $R^7$, and $R^8$ each represent a lower alkyl group; A represents

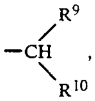

in which $R^9$ and $R^{10}$ each represent hydrogen, —CN or —$COR^{14}$ in which $R^{14}$ represents a phenyl group which is unsubstituted or is substituted by an alkyl group having 1 to 4 carbon atoms, an alkoxyl group having 1 to 4 carbon atoms, or a halogen, a naphthyl group which is unsubstituted or is substituted by an alkyl group having 1 to 4 carbon atoms, an alkoxyl group having 1 to 4 carbon atoms or a halogen, or a lower alkoxyl group,

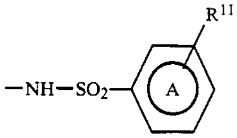

in which

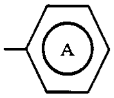

represents a phenyl group or a naphthyl group, $R^{11}$ represents hydrogen, a lower alkyl group, a halogen, an amino group, which is unsubstituted or is substituted by an alkyl group having 1 to 4 carbona toms, or a nitro group, or

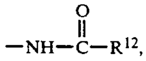

in which $R^{12}$ represents a lower alkyl group, or

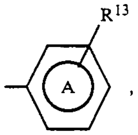

in which $R^{13}$ represents hydrogen, a lower alkyl group, a halogen, a hydroxyl gruop, a trifluoromethyl group, a nitro group, an amino group which is unsubstituted or is substituted by an alkyl group having 1 to 4 carbon atoms, or amide group, provided that both $R^9$ and $R^{10}$ may not be hydrogen; and at least one electron acceptor developer capable of inducing a coloring reaction when in contact with the leuco dye of formula.

18. The dye-containing composition as claimed in claim 17, wherein said electron acceptor developer is a member selected from the group consisting of a gallic acid ester between gallic acid and a $C_1$–$C_{22}$ long chain fatty acid, and ethyl protocatechuate.

* * * * *

UNITED STATES PATENT AND TRADEMARK OFFICE

CERTIFICATE OF CORRECTION

PATENT NO. : 5,057,154

DATED : OCTOBER 15, 1991

INVENTOR(S) : SHIGERU KUSAKATA ET AL

It is certified that error appears in the above-identified patent and that said Letters Patent is hereby corrected as shown below:

Column 3, line 15, after "R''", insert --represents--;
line 25, delete "or" second occurrance.

Column 4, line 35, delete "tetrakis(p-dialkylamionophenyl), and insert --tetrakis(p-dialkylaminophenyl--;
line 37, after "formulae", insert --(--.

Column 5, line 35, after "formula", insert --(--;
line 44, after "malononitrile", insert --(--;
line 48, after "malononitrile", insert --(--;
line 57, after "tetra-", insert --(--;
line 62, after "benzoylmethane", insert --(--;
line 63, after "benzoylmethane", insert --(--.

Column 6, line 7, after "dibenzoylmethane", insert --(--;
line 45, after "malonate", insert --(--;
line 53, after "malonate", insert --(--;
line 59, after "malonate", insert --(--;
line 67, after "formula", insert --(--.

Column 7, line 12, after "benzenesulfonamide", insert --(--;
line 27, after "1,1,5,5-tetra-", insert --(--;
line 65, after "1,1,5,5-tetra-", insert --(--;
line 68, after "chlorobenzamide", insert --(--.

Column 8, line 31, after "ployed", insert --.--;
line 35, after employed", insert--.--;
line 38, after "to", insert --(--;
line 59, delete "trichloromerhylanilino", insert --trichloromethylanilino--.

UNITED STATES PATENT AND TRADEMARK OFFICE

CERTIFICATE OF CORRECTION

PATENT NO. : 5,057,154

DATED : OCTOBER 15, 1991

INVENTOR(S) : SHIGERU KUSAKATA ET AL

It is certified that error appears in the above-identified patent and that said Letters Patent is hereby corrected as shown below:

Column 9, line 5, after "5'", insert -- - --;
lines 6 and 7, after "-3-", insert --(-- and after "5", insert -- - --;
line 8, delete "(2'-hydroxy-4'dimethylaminophenyl" and insert --(2'-methoxy-5'methylphenyl)--;
line 9, after "methyl-", insert --(--;
line 39, delete "for", insert --from--;
line 53, after "of", insert --(--;
line 67, after "cyclohexylidenebisphenol", delete --u--.

Column 10, line 3, after "butylidenebis", insert --(--;
line 44, delete" 2,4'-diphensolsulfone", insert --2,4'-diphenolsulfone--;
line 50, after "methyldiphenylsulfone.", start new a paragraph.

Column 11, line 38, after "urea", insert -- - --;
line 57, after "paper", insert --.--;
line 65, after "agent", insert --.--.

Column 12, line 2, after "layers", insert --.--;
line 62, after "cooling", insert --.--.

Column 13, line 11, after "calcium", insert --(--;
line 16, delete "therfrom", insert --therefrom--;
lines 19 and 20, delete "dinethylaminophenyl", insert --dimethylaminophenyl--;
line 22, after "9.48 g", insert --(--;
line 42, delete "p-dime-thylaminophenyl), insert --p-dimethylaminophenyl--;
line 52, after "1,1,5,5-tetra-", insert --(--.

UNITED STATES PATENT AND TRADEMARK OFFICE

CERTIFICATE OF CORRECTION

PATENT NO. : 5,057,154

DATED : OCTOBER 15, 1991

INVENTOR(S) : SHIGERU KUSAKATA ET AL

It is certified that error appears in the above-identified patent and that said Letters Patent is hereby corrected as shown below:

Column 14, line 15, delete "choride", insert --chloride.--.

Column 15, line 38, after "washed", insert --with--;
line 48, after "5-tetra-", insert --(--.

Column 16, line 4, after "1,1,5,5-tetra-", insert --(--;
line 18, after "2.0 g", insert --of--;
line 30, after "benzolymethane", insert --(--.

Column 17, line 5, delete "8-naphthoylmethane", insert --β-napththoylmethane--;
lines 29 and 30, delete "pentadinene-diacetylmethane" insert --pentadinene-3-diacetylmethane--;
line 44, delete "5.0 g", insert --5.0 g--;
lines 52 and 53, "delete "pentadiene-dibenzoylmethane", insert --pentadine-3-dibenzoylmethane--.

Column 18, lines 12 and 13, delete "pentadiene-dimethyl", insert, --pentadiene-3-dimethyl--;
line 33, delete "din", insert --in--;
lines 43 and 44, delete "pentadiene-diethyl", insert, --pentadiene-3-diethyl--.

Column 19, lines 4 and 5, delete "pentadine-di-isopropyl, insert --pentadine-3-di-isopropyl--;
line 25, delete "diisopropyl", insert --di-isopropyl--
line 27, after "crystals", insert --.--;
lines 34 and 35, delete "pentadiene-di-n-butyl", insert --pentadiene-3-di-n-butyl--;
lines 56 and 57, delete "pentadiene-di-n-butyl", insert --pentadiene-3-di-butyl--.

UNITED STATES PATENT AND TRADEMARK OFFICE

CERTIFICATE OF CORRECTION

PATENT NO. : 5,057,154

DATED : OCTOBER 15, 1991

INVENTOR(S) : SHIGERU KUSAKATA ET AL

It is certified that error appears in the above-identified patent and that said Letters Patent is hereby corrected as shown below:

Column 20, line 19, delete "was", insert --were--;
line 39, delete "hydrogen-barbonate", insert --hydrogen-carbonate--;
line 44, after "mixture", insert --.--;
line 51, delete "3-o-toluene-sulfonamide", insert --3-o-toluenesulfonamide--.

Column 21, line 14, delete "filtratin", insert --filtration--;
lines 21 and 22, delete "3-p-chlorobenzene", insert, --3-p-3-chlorobenzene--;
line 32, after "spectrum", insert --(--;
line 35, delete "$_{\nu vs}$", insert --$_{\nu s}$--;
lines 55 and 56, delete "1,4-pentadiene-3-p-napthalenesulfonamide", insert --1,4-pentadiene-3-α-napthalenesulfonamide--;
line 58, delete "the", insert --The--;
line 65, after "λmax", insert --(--;
line 67, after "2800 $cm^{-1}$, insert --νCH--.

Column 22, line 3, after "1,1,5,5-tetra-", insert --(--;
line 4, delete "8", insert --β--;
line 6, after "1,1,5,6-tetra-", insert --(--;
line 10, before "DMF)", insert --(--
line 20, delete "8", insert --β--
line 32, delete "2800 $cm^{-1\ \nu CH}$", insert --2800 $cm^{-1}$ νCH;

Column 23, line 6, before "Leuco", insert --(--;
line 9, delete "minobenzenesulfonamide", insert --aminobenzenesulfonamide--;

UNITED STATES PATENT AND TRADEMARK OFFICE

CERTIFICATE OF CORRECTION

PATENT NO. : 5,057,154

DATED : OCTOBER 15, 1991

INVENTOR(S) : SHIGERU KUSAKATA ET AL

It is certified that error appears in the above-identified patent and that said Letters Patent is hereby corrected as shown below:

Column 23, line 23, before "Leuco", insert --(--;
line 24, before "invention", insert --present--.

Column 24, line 4, delete "1510 $m^{-1}$", insert --1500 $cm^{-1}$--;
line 34, delete "$\epsilon$max", insert --$\lambda$max--;
line 36, delete "501 nm, s: $3.8X10^4$, insert --501 nm, $\epsilon$: $3.8X10^4$;
line 38, after "(by KBr tablet)", insert --3440 $cm^{-1}$ $\nu$CH,--.

Column 25, line 67, before "Leuco", insert --(--.

Column 26, line 18, delete "8", insert --$\beta$--;
line 26, delete "8", insert --$\beta$--;
lines 36 and 37, delete "8-naphthobenzamide", insert --$\beta$-napthobenzamide--.

Column 27, delete lines 43-44 in its entirety.

Column 28, line 6, Table 1, delete "Ex. 1-27", insert --1-28--; and delete "No. 2", insert --No. 3--;
line 64, after "weight", insert --of--.

Column 30, line 4, after "measured", insert --.--.

Column 31, line 61, delete "Liqud", insert --Liquid--.

UNITED STATES PATENT AND TRADEMARK OFFICE
CERTIFICATE OF CORRECTION

PATENT NO. : 5,057,154

DATED : OCTOBER 15, 1991

INVENTOR(S) : SHIGERU KUSAKATA ET AL

It is certified that error appears in the above-identified patent and that said Letters Patent is hereby corrected as shown below:

Column 32, line 10, delete "means", insert --mean--;
line 35, delete "thermo-sensitive", insert --thermosensitive--;
line 61, delete "2-0", insert -- 2-9 --;
line 68, delete "example", insert --Example--.

Column 34, line 33, after "No. 3", delete --}--.

Column 37, line 46, delete "fomrer", insert --former--;
line 61, delete "EAxample", insert --Example--.

Column 38, line 29, after "prepared", insert --.--;
line 61, delete "-$CON^{14}$", insert --$COR^{14}$--.

Column 40, line 17, delete "an" (second occurrence), insert --a--.

Column 41, line 38, delete "methyl-7-(n-", insert --methyl-7-(N- --.

UNITED STATES PATENT AND TRADEMARK OFFICE

CERTIFICATE OF CORRECTION

PATENT NO. : 5,057,154

DATED : October 15, 1991

INVENTOR(S) : Shigeru Kusakata, et. al.

It is certified that error appears in the above-indentified patent and that said Letters Patent is hereby corrected as shown below:

Column 42, line 28, delete "carbona", insert --carbon--;

line 53, after "formula", insert --(1)--.

Signed and Sealed this

Nineteenth Day of October, 1993

Attest:

Bruce Lehman

BRUCE LEHMAN

*Attesting Officer*

*Commissioner of Patents and Trademarks*